US012589545B2

(12) United States Patent
Dando et al.

(10) Patent No.: US 12,589,545 B2
(45) Date of Patent: Mar. 31, 2026

(54) APPARATUS AND METHOD FOR ROLL FORMING THERMOPLASTIC COMPOSITES

(71) Applicant: Spirit AeroSystems, Inc., Wichita, KS (US)

(72) Inventors: Kerrick Dando, Wichita, KS (US); Mark Anthony Wadsworth, Wichita, KS (US); Rahbar Nasserrafi, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 254 days.

(21) Appl. No.: 18/134,757

(22) Filed: Apr. 14, 2023

(65) Prior Publication Data

US 2024/0342975 A1     Oct. 17, 2024

(51) Int. Cl.
B29C 65/00          (2006.01)
B29C 51/14          (2006.01)
(Continued)

(52) U.S. Cl.
CPC .............. B29C 51/14 (2013.01); B29C 51/22 (2013.01); B29C 51/265 (2013.01); *B29C 65/02* (2013.01);
(Continued)

(58) Field of Classification Search
CPC ..... B29C 65/02; B29C 65/0681; B29C 65/20; B29C 65/242
See application file for complete search history.

(56) References Cited

U.S. PATENT DOCUMENTS

| | | | |
|---|---|---|---|
| 8,333,858 | B2 | 12/2012 | Rubin et al. |
| 10,457,026 | B2 | 10/2019 | Mühlhause et al. |

(Continued)

FOREIGN PATENT DOCUMENTS

| | | |
|---|---|---|
| CN | 106965505 A | 7/2017 |
| EP | 0372505 A1 | 6/1990 |
| WO | 2017080841 A1 | 5/2017 |

OTHER PUBLICATIONS

European Search Report, Europe Patent Application No. 24169634. 3, dated Sep. 9, 2024, 7 pages, European Patent Office, Munich, Germany.

*Primary Examiner* — Philip C Tucker
*Assistant Examiner* — Nickolas R Harm
(74) *Attorney, Agent, or Firm* — Stinson LLP

(57)          ABSTRACT
An apparatus for roll forming thermoplastic composites comprises a plurality of thermoplastic composite material spools, a plurality of thermoplastic composite material rollers, a plurality of sheet metal spools, a plurality of welding rollers, an oven, a forming roller, a pair of pinch rollers. The thermoplastic composite material spools retain plies of thermoplastic composite material. The plies flow through the thermoplastic composite material rollers to form a layup. The sheet metal spools retain metal sheets. The metal sheets and the layup flow through the welding rollers to form a metal composite material laminate. The oven heats the metal composite material laminate. The forming roller imparts a curvature to the metal composite material laminate. The pinch rollers receive the metal composite material laminate from the forming roller, pull the metal composite material laminate, and output the metal composite material laminate in a heated and compressed state.

16 Claims, 13 Drawing Sheets

(51) Int. Cl.

| | |
|---|---|
| *B29C 51/22* | (2006.01) |
| *B29C 51/26* | (2006.01) |
| *B29C 65/02* | (2006.01) |
| *B29C 65/06* | (2006.01) |
| *B29C 65/20* | (2006.01) |
| *B29C 65/24* | (2006.01) |
| *B29K 101/12* | (2006.01) |
| *B29K 705/02* | (2006.01) |
| *B29K 705/08* | (2006.01) |

(52) U.S. Cl.

CPC .......... *B29C 65/0681* (2013.01); *B29C 65/20* (2013.01); *B29C 65/242* (2013.01); *B29K 2101/12* (2013.01); *B29K 2705/02* (2013.01); *B29K 2705/08* (2013.01)

(56) References Cited

U.S. PATENT DOCUMENTS

| | | | |
|---|---|---|---|
| 2003/0168555 A1 | 9/2003 | Livi et al. | |
| 2007/0175575 A1* | 8/2007 | Rubin | ..................... B29C 65/02 |
| | | | 156/196 |
| 2020/0180243 A1* | 6/2020 | Okamoto | ............. B29C 70/462 |

* cited by examiner

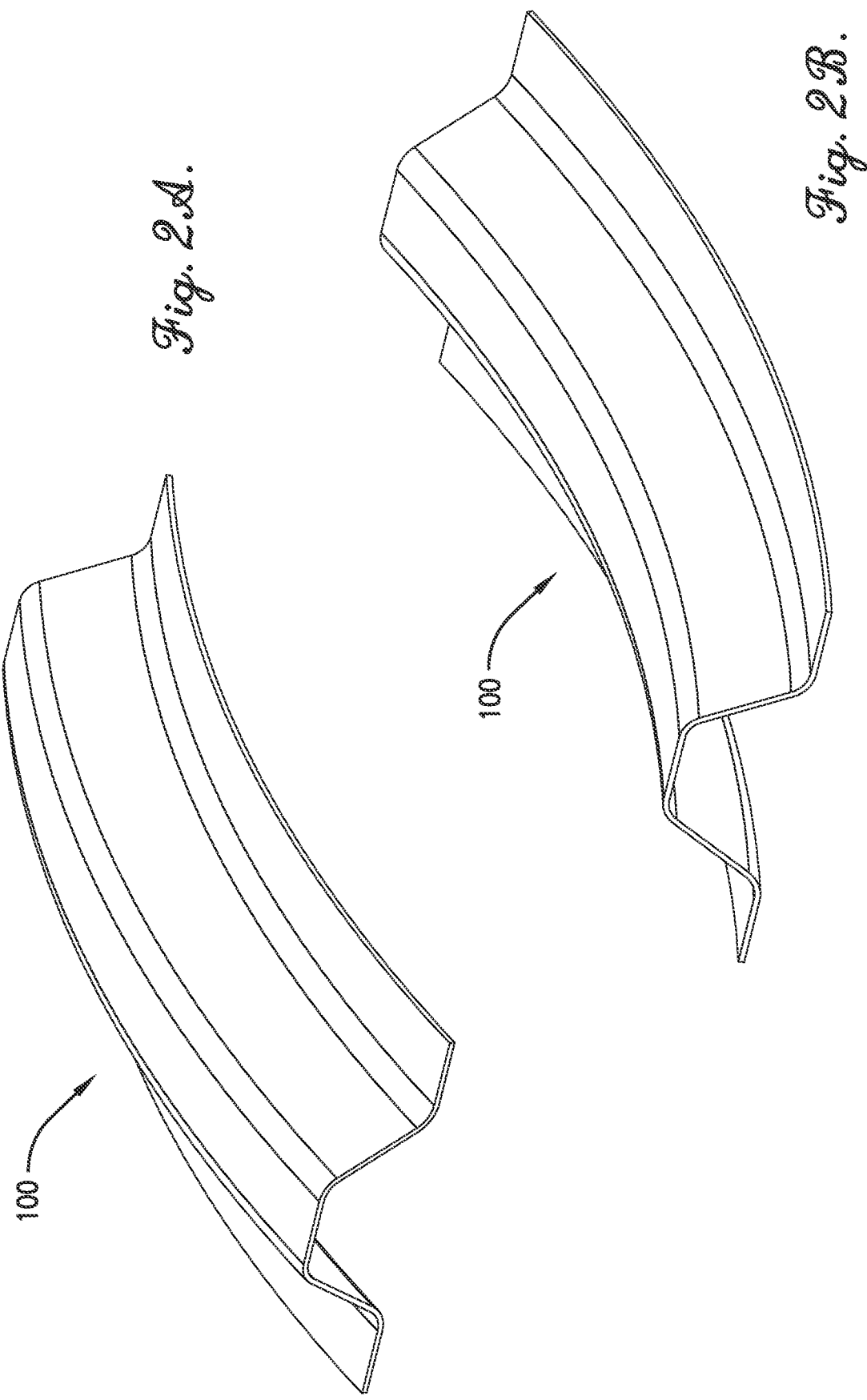

100

100

0° FIBER
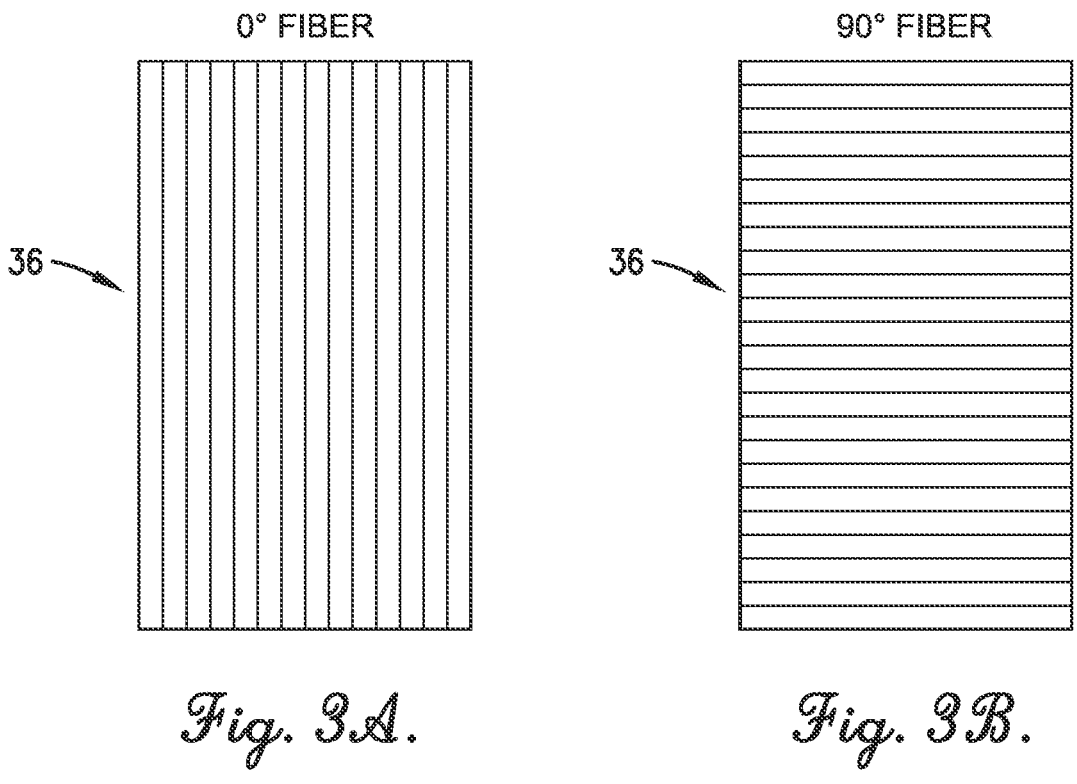
90° FIBER
36
*Fig. 3A.*
*Fig. 3B.*
+45° FIBER
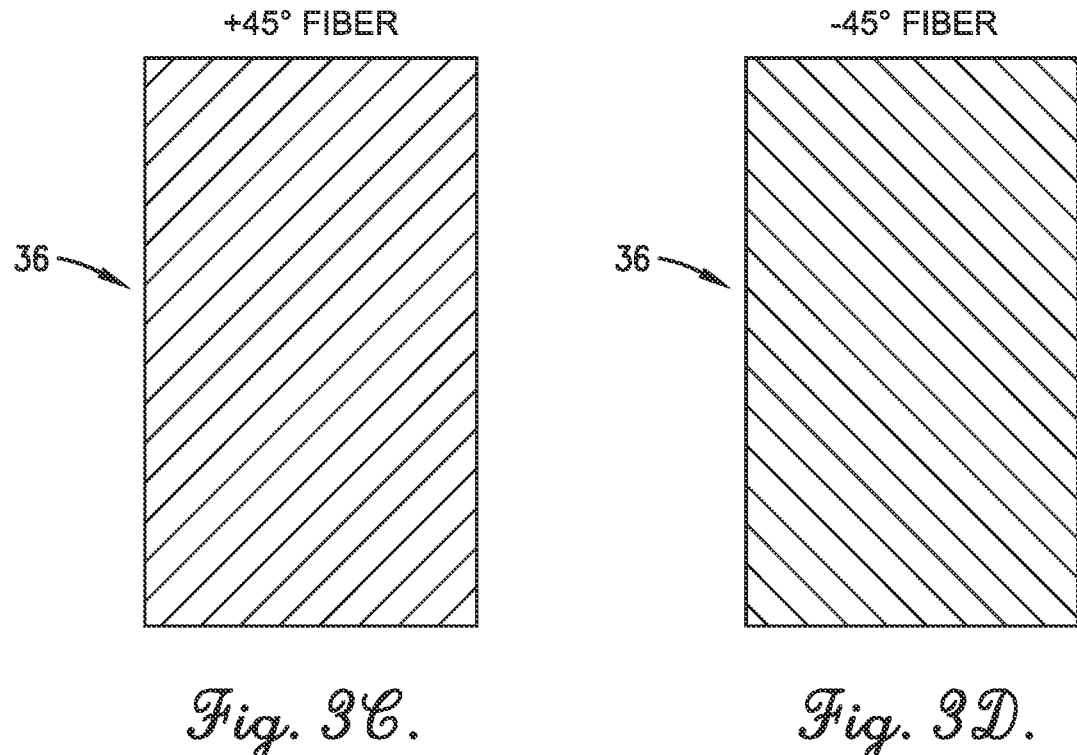
-45° FIBER
36
*Fig. 3C.*
*Fig. 3D.*

5B.

100

5B.

METAL
-45°FIBER
90° FIBER
+45°FIBER
METAL

0° FIBER

200

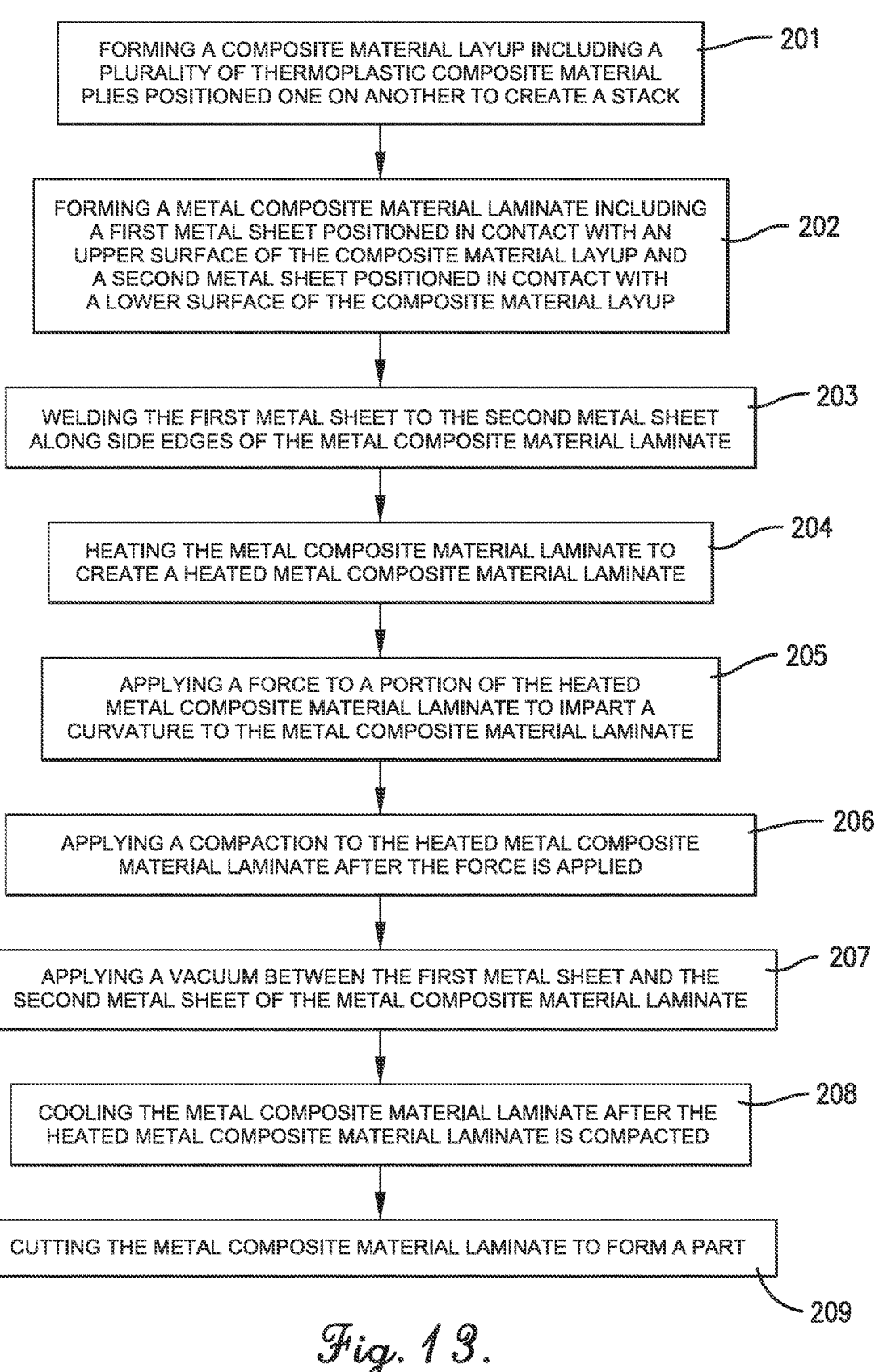

FORMING A COMPOSITE MATERIAL LAYUP INCLUDING A PLURALITY OF THERMOPLASTIC COMPOSITE MATERIAL PLIES POSITIONED ONE ON ANOTHER TO CREATE A STACK — 201

FORMING A METAL COMPOSITE MATERIAL LAMINATE INCLUDING A FIRST METAL SHEET POSITIONED IN CONTACT WITH AN UPPER SURFACE OF THE COMPOSITE MATERIAL LAYUP AND A SECOND METAL SHEET POSITIONED IN CONTACT WITH A LOWER SURFACE OF THE COMPOSITE MATERIAL LAYUP — 202

WELDING THE FIRST METAL SHEET TO THE SECOND METAL SHEET ALONG SIDE EDGES OF THE METAL COMPOSITE MATERIAL LAMINATE — 203

HEATING THE METAL COMPOSITE MATERIAL LAMINATE TO CREATE A HEATED METAL COMPOSITE MATERIAL LAMINATE — 204

APPLYING A FORCE TO A PORTION OF THE HEATED METAL COMPOSITE MATERIAL LAMINATE TO IMPART A CURVATURE TO THE METAL COMPOSITE MATERIAL LAMINATE — 205

APPLYING A COMPACTION TO THE HEATED METAL COMPOSITE MATERIAL LAMINATE AFTER THE FORCE IS APPLIED — 206

APPLYING A VACUUM BETWEEN THE FIRST METAL SHEET AND THE SECOND METAL SHEET OF THE METAL COMPOSITE MATERIAL LAMINATE — 207

COOLING THE METAL COMPOSITE MATERIAL LAMINATE AFTER THE HEATED METAL COMPOSITE MATERIAL LAMINATE IS COMPACTED — 208

CUTTING THE METAL COMPOSITE MATERIAL LAMINATE TO FORM A PART — 209

*Fig. 13.*

APPARATUS AND METHOD FOR ROLL FORMING THERMOPLASTIC COMPOSITES

BACKGROUND OF THE INVENTION

Thermoplastic composite material parts that are used in aircraft often have a curvature as well as non-planar cross-sectional features. Examples include stiffening elements, such as stringers, which are structures that are attached or bonded to a skin, i.e., the outer layer, of a fuselage or a wing of an aircraft, and provide structural reinforcement and prevents buckling of the skin. Techniques such as stamp forming and continuous compression molding have been used to form these types of parts. However, each technique has drawbacks. Stamp forming utilizes tools and presses that do not scale well to forming larger parts such as stiffening elements. Continuous compression molding utilizes a multi temperature and variable section tool set for forming large scale parts. The drawback is that continuous compression molding has difficulty forming parts with non-planar or curved features.

SUMMARY OF THE INVENTION

Embodiments of the current invention address one or more of the above-mentioned problems and provide a distinct advance in the art of fabricating thermoplastic composite material parts used in aircraft. The current invention provides a toolless apparatus and method for fabricating thermoplastic composite material parts which uses roll forming techniques to produce a curvature in large scale parts. The apparatus broadly comprises a plurality of thermoplastic composite material spools, a plurality of thermoplastic composite material rollers, a plurality of sheet metal spools, a plurality of welding rollers, an oven, a forming roller, and a pair of pinch rollers. Each thermoplastic composite material spool is configured to retain and supply a thermoplastic composite material ply. The thermoplastic composite material rollers are configured to receive a plurality of thermoplastic composite material plies and output a thermoplastic composite material layup including the thermoplastic composite material plies positioned one on another to form a stack. Each sheet metal spool is configured to retain and supply a metal sheet. The welding rollers are configured to receive a first metal sheet, a second metal sheet, and the thermoplastic composite material layup and output a metal composite material laminate including the first metal sheet positioned in contact with an upper surface of the thermoplastic composite material layup and the second metal sheet positioned in contact with a lower surface of the thermoplastic composite material layup. The oven is configured to heat the metal composite material laminate. The forming roller is positioned within the oven and is configured to receive the metal composite material laminate and to selectively move along one or more axes in order to impart a curvature on the metal composite material laminate. The pinch rollers are configured to receive the metal composite material laminate from the forming roller, to pull the metal composite material laminate, and to output the metal composite material laminate in a heated and compressed state.

Another embodiment of the apparatus broadly comprises a plurality of thermoplastic composite material spools, a plurality of thermoplastic composite material rollers, a plurality of sheet metal spools, a plurality of welding rollers, an oven, a plurality of guide rollers, a vacuum source, a forming roller, and a pair of pinch rollers. Each thermoplastic composite material spool is configured to retain and supply a thermoplastic composite material ply. The thermoplastic composite material rollers are configured to receive a plurality of thermoplastic composite material plies and output a thermoplastic composite material layup including the thermoplastic composite material plies positioned one on another to form a stack. Each sheet metal spool is configured to retain and supply a metal sheet. The welding rollers are configured to receive a first metal sheet, a second metal sheet, and the thermoplastic composite material layup, weld the first metal sheet to the second metal sheet, and output a metal composite material laminate including the first metal sheet positioned in contact with an upper surface of the thermoplastic composite material layup and the second metal sheet positioned in contact with a lower surface of the thermoplastic composite material layup wherein the first metal sheet is welded to the second metal sheet along side edges of the thermoplastic composite material layup. The oven is configured to heat the metal composite material laminate. The guide rollers are positioned in the oven and are configured to apply tension to the metal composite material laminate as the metal composite material laminate is heated and to control a direction of travel for the metal composite material laminate through the oven. The vacuum source is configured to apply a vacuum between the first metal sheet and the second metal sheet of the metal composite material laminate. The forming roller is positioned within the oven and is configured to receive the metal composite material laminate and to selectively move along one or more axes in order to impart a curvature on the metal composite material laminate. The pinch rollers are configured to receive the metal composite material laminate from the forming roller, to pull the metal composite material laminate, and to output the metal composite material laminate in a heated and compressed state.

The method broadly comprises the steps of forming a composite material layup including a plurality of thermoplastic composite material plies positioned one on another to create a stack; forming a metal composite material laminate including a first metal sheet positioned in contact with an upper surface of the composite material layup and a second metal sheet positioned in contact with a lower surface of the composite material layup; heating the metal composite material laminate to create a heated metal composite material laminate; applying a force to a portion of the heated metal composite material laminate to impart a curvature to the metal composite material laminate; and applying a compaction to the heated metal composite material laminate after the force is applied.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein:

FIG. 2A is a perspective view of a first type of a part formed by the apparatus, the part having a first curvature;

FIG. 2B is a perspective view of the first type of part formed by the apparatus, the part having a second curvature;

FIG. 3A is a schematic representation of a thermoplastic composite material ply which includes a zero-degree fiber orientation;

FIG. 3B is a schematic representation of a thermoplastic composite material ply which includes a 90-degree fiber orientation;

FIG. 3C is a schematic representation of a thermoplastic composite material ply which includes a 45-degree fiber orientation;

FIG. 3D is a schematic representation of a thermoplastic composite material ply which includes a negative 45-degree fiber orientation;

FIG. 13 includes a listing of at least a portion of the steps of a method for roll forming thermoplastic composites.

Figure 1:
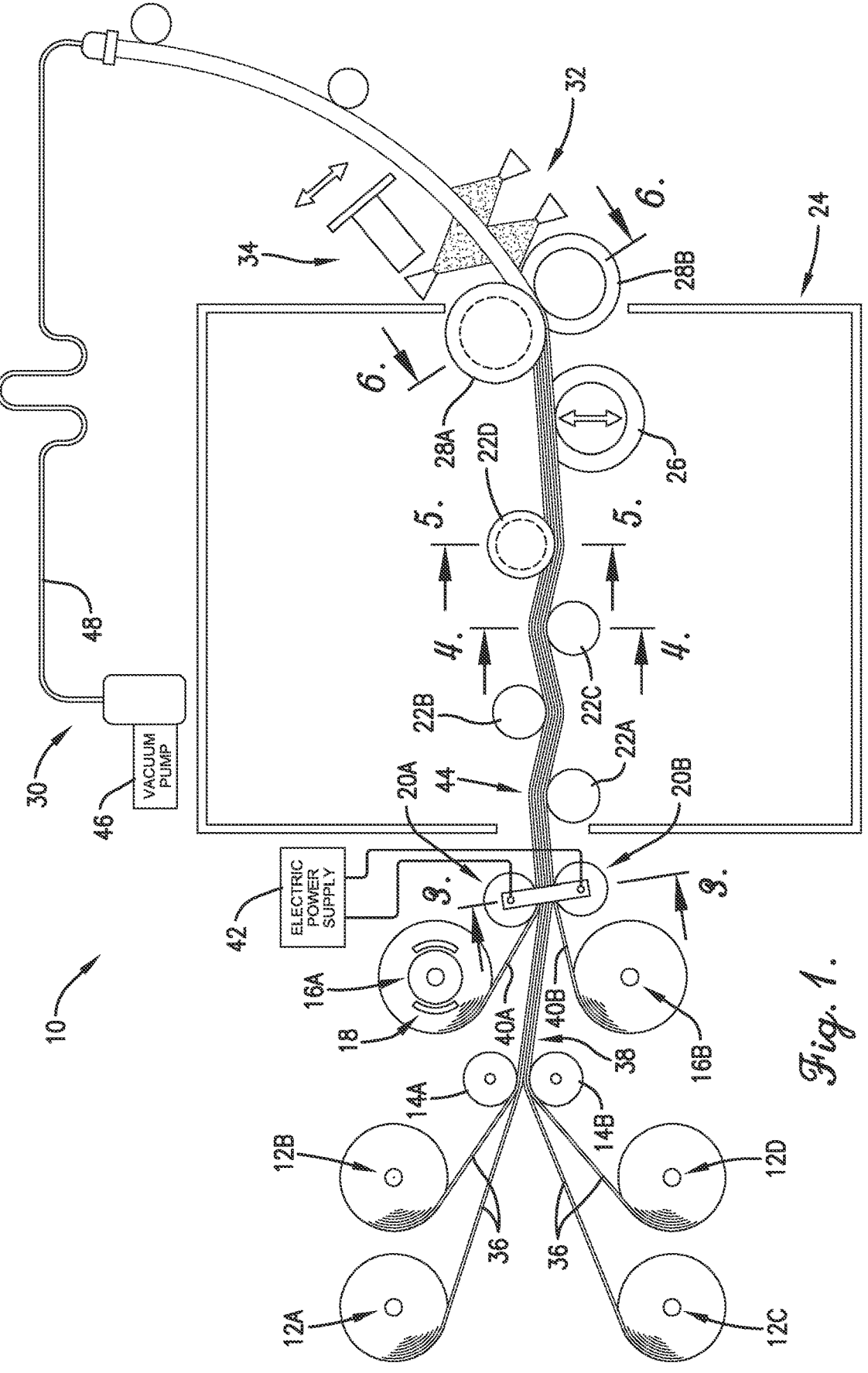
FIG. 1 is a side schematic view of an apparatus, constructed in accordance with various embodiments of the current invention, for roll forming thermoplastic composites.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Figures 2C, 2D:
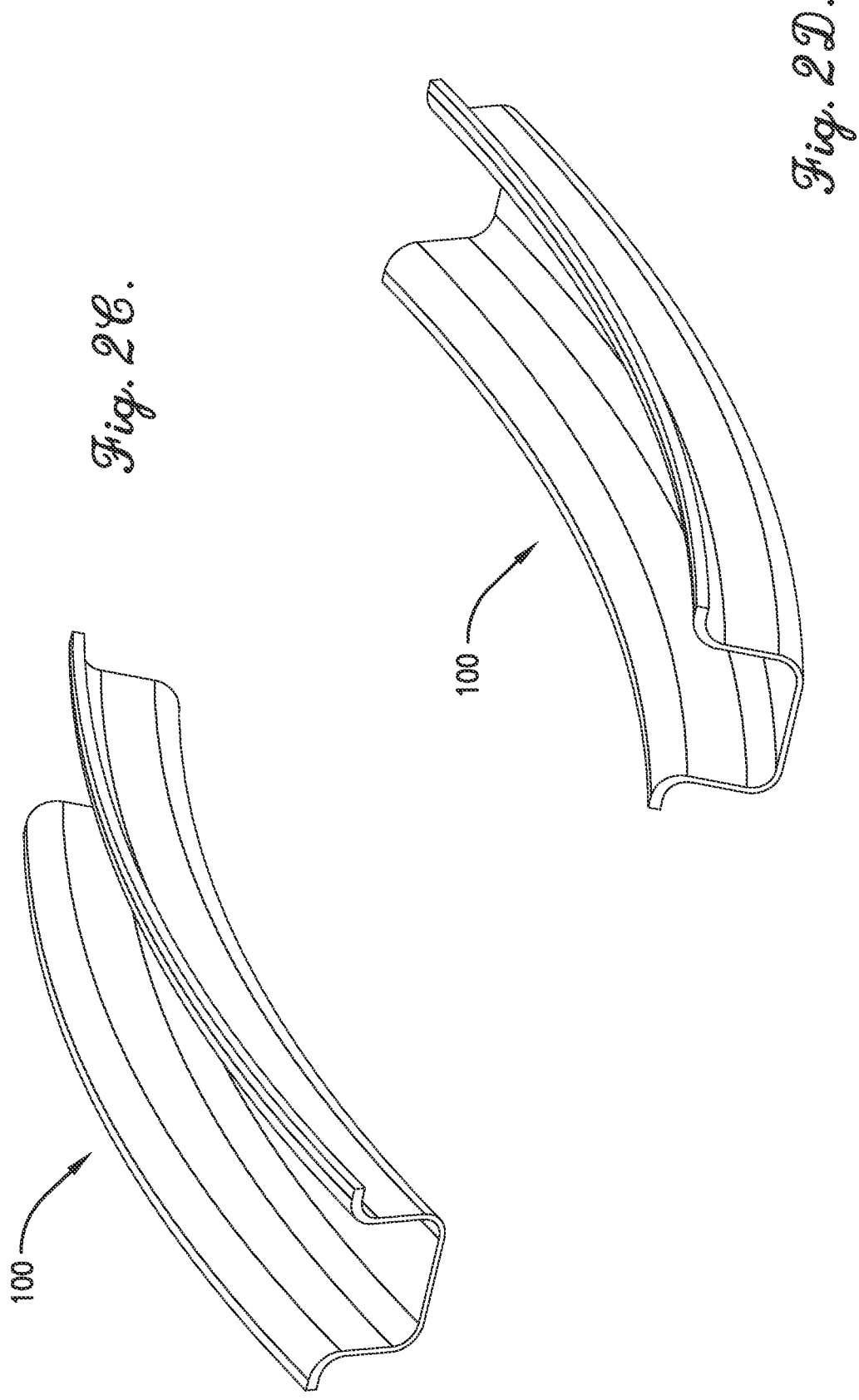
FIG. 2C is a perspective view of a second type of a part formed by the apparatus, the part having a first curvature.
FIG. 2D is a perspective view of the second type of part formed by the apparatus, the part having a second curvature.

An apparatus 10, constructed in accordance with various embodiments of the current invention, for roll forming thermoplastic composites is shown in FIG. 1. The apparatus 10 applies roll forming techniques to thermoplastic composite material to fabricate or produce a composite material part 100 (FIGS. 2A-2D) that is typically elongated and has a surface area which is much greater than its thickness— although the thickness of the part 100 may vary in different sections of the part 100. In addition, the part 100 includes a curvature in at least one direction or along at least one axis, wherein a radius of the curvature is variable. Although a wide variety of parts 100 may be fabricated by the apparatus 10, the apparatus 10 is primarily utilized to fabricate stiffening elements used in aircraft construction. A stiffening element, such as a stringer, is a structure that is attached or bonded to a skin, i.e., the outer layer, of a fuselage or a wing of an aircraft, and provides structural reinforcement and prevents buckling of the skin. Common stringer types of stiffening elements include hat or omega stringers and U-stringers. Stringer parts 100 fabricated by the apparatus 10 have a curvature along the length of the part 100 that corresponds to a curvature of the aircraft fuselage or wing. Examples of the stringer parts 100 are shown in the figures. Referring to FIGS. 2A and 2B, a hat stringer is shown with a first curvature and a second curvature. Likewise in FIGS. 2C and 2D, a U-stringer or omega stringer is shown with a first curvature and a second curvature.

Referring to FIG. 1, the apparatus 10 broadly comprises a plurality of thermoplastic composite material spools 12A, 12B, 12C, 12D, a first thermoplastic composite material roller 14A, a second thermoplastic composite material roller 14B, a first sheet metal spool 16A, a second sheet metal spool 16B, a brake 18, a first welding roller 20A, a second welding roller 20B, a plurality of guide rollers 22A, 22B, 22C, 22D, an oven 24, a forming roller 26, a first pinch roller 28A, a second pinch roller 28B, a vacuum source 30, a cooling system 32, and a cutter 34.

Exemplary embodiments of the apparatus 10 include four thermoplastic composite material spools 12A, 12B, 12C, 12D, although a larger number or a smaller number of thermoplastic composite material spools 12A, 12B, 12C, 12D may be utilized. Each thermoplastic composite material spool 12A, 12B, 12C, 12D is similar to a bobbin or a creel and includes a cylindrical shaped tube around which thermoplastic composite material is retained, wrapped, wound, or spooled. The thermoplastic composite material spool 12A, 12B, 12C, 12D may also include a disc attached to each end of the tube to help keep the material on the thermoplastic composite material spool 12A, 12B, 12C, 12D. The thermoplastic composite material, as is known in the art, generally includes at least two constituent components—a reinforcement material and a matrix material, one or both of which is meltable. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. In the case of fiber-based reinforcement materials, the fiber may exist in one of at least two forms—either preimpregnated (prepreg), in which the fiber may be coated with a matrix material that is uncured and/or requires further heat treatment, such as uncured resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others.

The thermoplastic composite material retained on each thermoplastic composite material spool 12A, 12B, 12C, 12D is a unidirectional tape based thermoplastic composite material ply 36, which is a layer of fibers or fabric extending in one or more directions or having one or more orientations that are coordinated to the load path or loading characteristics of the structure. Typically, each thermoplastic composite material spool 12A, 12B, 12C, 12D retains one thermoplastic composite material ply 36 of thermoplastic composite material whose fibers are oriented or placed in a different direction from the fibers of the thermoplastic composite material plies 36 of other thermoplastic composite material spools 12A, 12B, 12C, 12D. For example, a first thermoplastic composite material spool 12A retains a first thermoplastic composite material ply 36 with fibers oriented in a first direction, a second thermoplastic composite material spool 12B retains a second thermoplastic composite material ply 36 with fibers oriented in a second direction, and so forth.

Common fiber orientation angles for thermoplastic composite material plies 36 are shown in the figures. Referring to FIG. 3A, a zero-degree fiber orientation is shown. Referring to FIG. 3B, a 90-degree fiber orientation is shown. Referring to FIG. 3C, a 45-degree fiber orientation is shown. Referring to FIG. 3D, a negative 45-degree fiber orientation is shown.

The fibers of the thermoplastic composite material plies 36, at least in the axial direction, are considered to be continuous. To achieve a higher radius of curvature and/or a larger cross-sectional profile of some of the composite material parts 100 which may be fabricated using the various embodiments of the current invention, the length of the fibers of the thermoplastic composite material plies 36 from one thermoplastic composite material ply 36 to another thermoplastic composite material ply 36 along the axial orientation varies during and after the curvature forming process. Generally, the length of the curve along the outer circumference is greater than the length of the curve along the inner circumference. Thus, the length of the axial oriented fibers of the thermoplastic composite material ply 36 on the outer circumference will need to be longer than the axial oriented fibers of the thermoplastic composite material ply 36 on the inner circumference. However, typically, continuous fibers are not extensible and do not yield enough in the axial direction to provide the amount of curvature that the composite material part 100 requires. As a result, in some embodiments, the fibers of the thermoplastic composite material plies 36, at least those oriented in the axial direction, are discontinuous, including stretch-broken fiber or aligned short fiber reinforcements. Other discontinuous fiber options include tailored universal feed stock for forming (TuFF) described in U.S. Pat. No. 10,669,659.

Figures 4A, 4B:
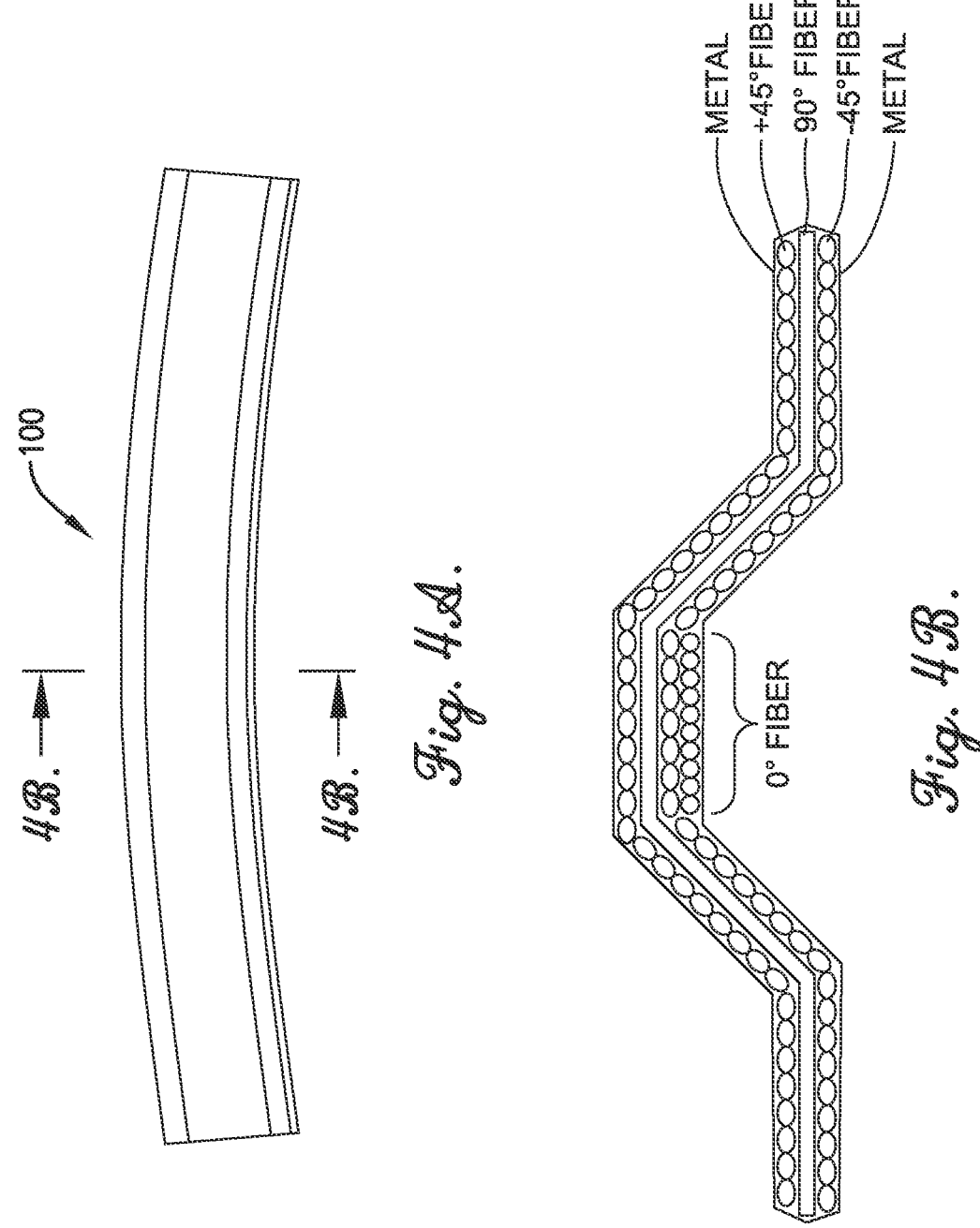
FIG. 4A is a side view of the first type of the part formed by the apparatus, the part having the first curvature.
FIG. 4B is a schematic sectional view of the first type of part cut along the line 4B-4B in FIG. 4A.
Figures 5A, 5B:
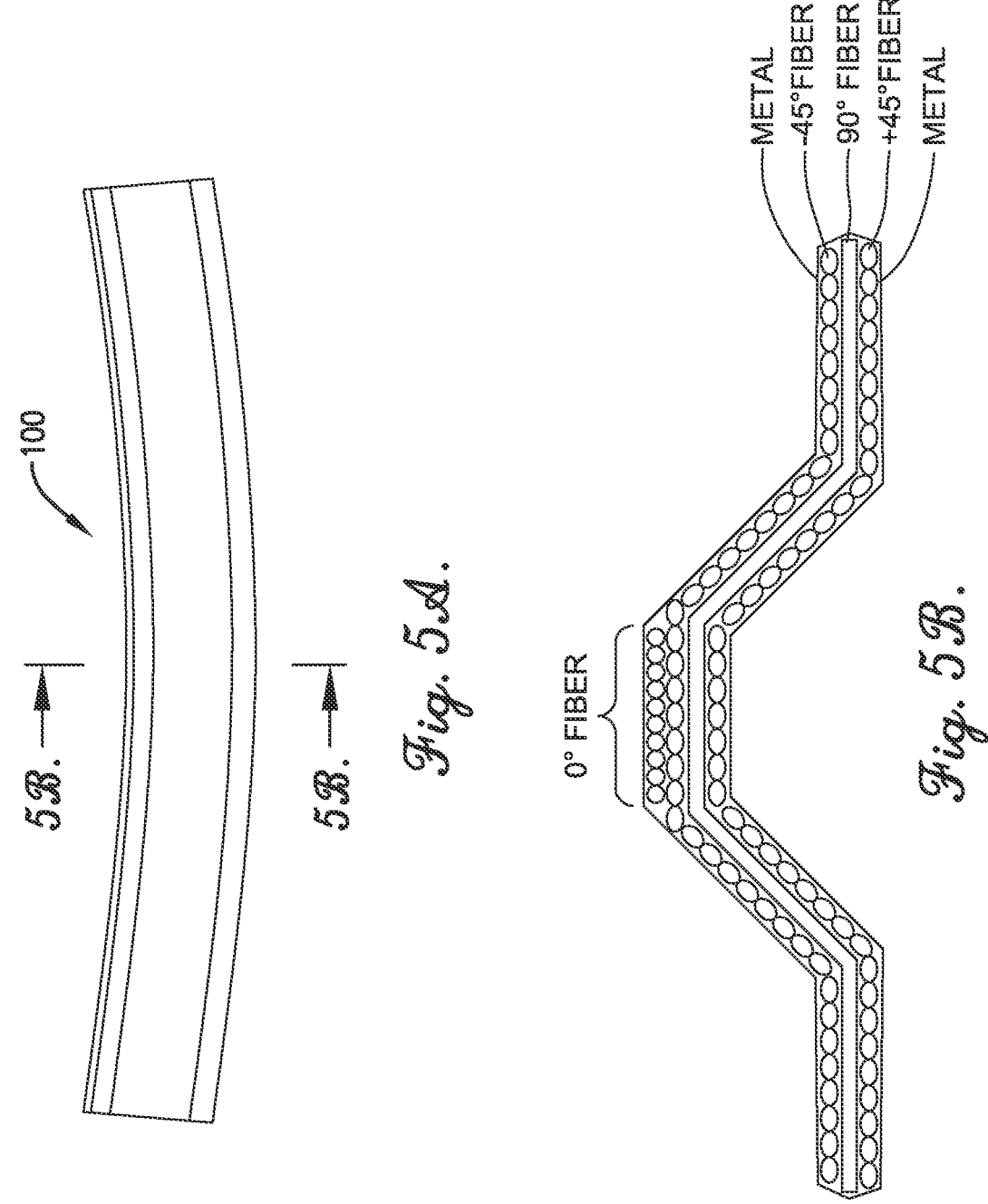
FIG. 5A is a side view of the first type of the part formed by the apparatus, the part having the second curvature.
FIG. 5B is a schematic sectional view of the first type of part cut along the line 5B-5B in FIG. 5A.

If only continuous fibers are used in the thermoplastic composite material plies 36, then zero-degree fibers are utilized only in the cap or apex of the final part 100 and only adjacent to the surface which has the smaller radius of curvature or forms the inner circumference of the curvature. For example, referring to FIG. 4A, a side view of a hat stringer final part 100 is shown, wherein the lower surface has the smaller radius of curvature and forms the inner circumference of the curvature. Therefore, as shown in the cross-sectional view of FIG. 4B, the zero-degree fibers are positioned adjacent to the lower surface in the cap, just above a layer of metal, described in more detail below. In the embodiment of FIG. 4B, the thermoplastic composite material spool 12D holds the zero-degree fiber thermoplastic composite material ply 36. Other orientations of the fibers form the remainder of the layers of the stack of thermoplastic composite material plies 36. Another example is shown in the side view of the hat stringer final part 100 of FIG. 5A, wherein the upper surface has the smaller radius of curvature and forms the inner circumference of the curvature. Therefore, as shown in the cross-sectional view of FIG. 5B, the zero-degree fibers are positioned adjacent to the upper surface, just below a layer of metal. In the embodiment of FIG. 5B, the thermoplastic composite material spool 12B holds the zero-degree fiber thermoplastic composite material ply 36. In addition, the zero-degree fiber thermoplastic composite material ply 36 has a width roughly equal to a width of the top or bottom, as appropriate, of the cap of the final part 100.

The thermoplastic composite material spools 12A, 12B, 12C, 12D are held by a framework or other support structure in a configuration that allows the thermoplastic composite material plies 36 to be unspooled, or streamed, to form a thermoplastic composite material layup 38, that is a stack with the thermoplastic composite material plies 36 positioned one on top of another. Typically, two of the thermoplastic composite material spools 12A, 12B are held above or over two of the other thermoplastic composite material spools 12C, 12D and each thermoplastic composite material ply 36 is unspooled in the direction of the thermoplastic composite material rollers 14A, 14B.

Each thermoplastic composite material roller 14A, 14B includes a cylindrical shaped tube with a circumferential surface configured to rotate about a central longitudinal axis. The thermoplastic composite material rollers 14A, 14B are positioned parallel to one another such that there is a small gap between the surface of the first thermoplastic composite material roller 14A and the surface of the second thermoplastic composite material roller 14B. The thermoplastic composite material rollers 14A, 14B receive the thermoplastic composite material plies 36, which travel through the gap and form the thermoplastic composite material layup 38.

Each sheet metal spool 16A, 16B is similar to a bobbin or a creel and includes a cylindrical shaped tube around which a metal sheet 40 formed from a metal or a metal alloy is retained, wrapped, wound, or spooled. Each sheet metal spool 16A, 16B may also include a disc attached to each end of the tube to help keep the material on the sheet metal spool 16A, 16B. The metal sheet 40 is typically thin compared to its surface area such as a generally flexible foil. Exemplary metals include aluminum, titanium, or the like. A first sheet metal spool 16A retains a first metal sheet 40A. A second sheet metal spool 16B retains a second metal sheet 40B.

The sheet metal spools 16A, 16B are positioned downstream from the thermoplastic composite material rollers 14A, 14B such that the first sheet metal spool 16A is positioned above the thermoplastic composite material layup 38 (output from the thermoplastic composite material rollers 14A, 14B) and the second sheet metal spool 16B is positioned below the thermoplastic composite material layup 38.

The brake 18 may be a mechanical brake that operates on the sheet metal spool 16 directly. The amount of rotation resistance, or braking, is variable and controllable either manually by an operator or automatically by an electronic controller or computing device. The brake 18 provides resistance to the rotation of one of the sheet metal spools, which, in exemplary embodiments, is the first sheet metal spool 16A. The braking creates a tensile strain on the first metal sheet 40A, but not on the second metal sheet 40B—which in turn, forms a differential tension or strain in the longitudinal direction between the two metal sheets 40A, 40B.

Figure 6:
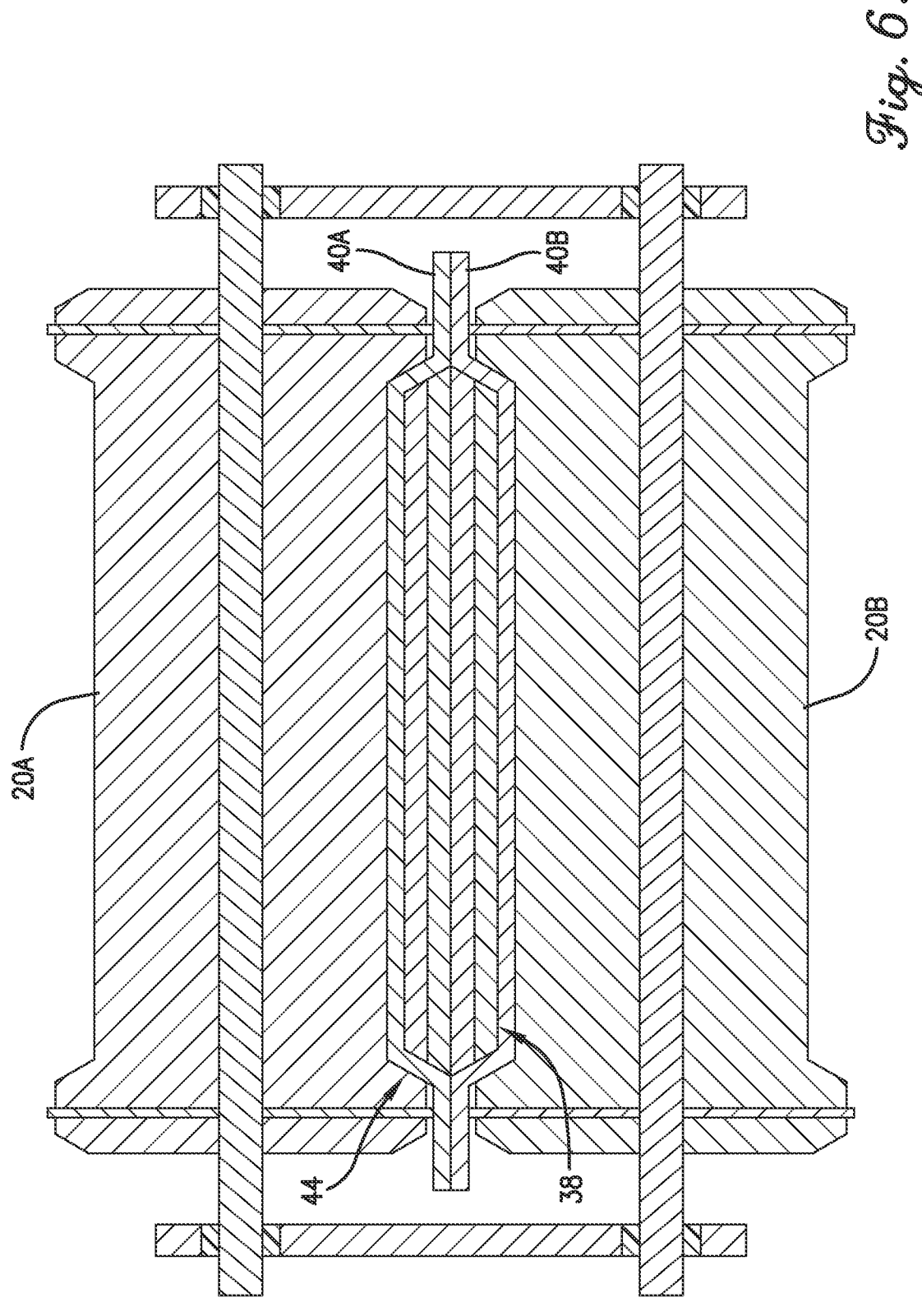
FIG. 6 is a cross-sectional view, cut along line 3-3 of FIG. 1, of a pair of welding rollers through which a metal composite material laminate flows.

The welding rollers 20A, 20B may utilize one of many techniques of welding widely known in the art for welding thin foil sheets such as resistance, ultrasonic, laser or other methods of welding, each being more applicable for particular foil metals. Although many methods of welding foil can be used, the example of resistance welding will be described herein but other methods can be used without departing from the scope of the technology as recited in the claims. Each welding roller 20A, 20B includes a cylindrical shaped tube with a circumferential surface configured to rotate about a rod, or axle, with a central longitudinal axis. Referring to FIG. 6, each welding roller 20A, 20B further includes a first flange protruding radially outward and positioned along the circumference of a first end of the tube. Each welding roller 20A, 20B also includes a second flange protruding radially outward and positioned along the circumference of a second end of the tube. Each welding roller 20A, 20B is formed from a metal, such as copper, or a metal alloy. The central rod of each welding roller 20A, 20B is also formed from metal or a metal alloy, such that each welding roller 20A, 20B is electrically conductive. The welding rollers 20A, 20B are positioned parallel to one another such that there is a small gap between the flanges of the first welding roller 20A and the flanges of the second welding roller 20B. The welding rollers 20A, 20B are held in position by a pair of frames or panels which are formed from electrically insulating materials. Each frame is coupled to an opposing end of the welding rollers 20A, 20B. In addition, at least one of the frames includes a pair of openings with each opening allowing for electrical connection to a successive one of the welding rollers 20A, 20B.

The welding rollers 20A, 20B receive the first metal sheet 40A, the thermoplastic composite material layup 38, and the second metal sheet 40B, stacked in that order from top to bottom which forms a metal composite material laminate 44. The metal sheets 40A, 40B each have a width that is greater than a width of the thermoplastic composite material layup 38 so that, in the stack, the metal sheets 40A, 40B overhang the thermoplastic composite material layup 38 along the sides of the metal composite material laminate 44. Referring to FIG. 6, the metal composite material laminate 44 travels between the welding rollers 20A, 20B such that the thermoplastic composite material layup 38 is positioned between the flanges of the welding rollers 20A, 20B. The overhang of the metal sheets 40A, 40B along one side of the metal composite material laminate 44 contacts the flanges of one end of each welding roller 20A, 20B, and the overhang of the metal sheets 40A, 40B along the other side of the metal composite material laminate 44 contacts the flanges of the other end of each welding roller 20A, 20B.

The central rod of each welding roller 20A, 20B is electrically connected to an electric power supply 42. The electric power supply 42 (FIG. 1) is a direct current (DC) voltage power supply, or any other type of electric power source, that is configured to provide electric voltage and large values of electric current. In an exemplary embodiment, the central rod of the first welding roller 20A is electrically connected to a positive terminal of the electric power supply 42, and the central rod of the second welding roller 20B is electrically connected to a negative terminal of the electric power supply 42. In general, the welding rollers 20A, 20B are electrically connected to the electric power supply 42 so that there is an electric voltage between the two welding rollers 20A, 20B and electric current flows through the flanges of the first welding roller 20A, the overhang of the metal sheets 40A, 40B on each side of the metal composite material laminate 44, and the flanges of the second welding roller 20B. As the electric current flows through the overhang of the metal sheets 40A, 40B on each side of the metal composite material laminate 44, the first metal sheet 40A is welded to the second metal sheet 40B along the overhang strips.

Exemplary embodiments of the apparatus 10 include four guide rollers 22A, 22B, 22C, 22D, although a larger number or a smaller number of guide rollers 22A, 22B, 22C, 22D may be utilized. The guide rollers 22A, 22B, 22C, 22D control a direction of travel of the metal composite material laminate 44 through the oven 24, among other functions. In some embodiments such as the one shown in FIG. 1, the guide rollers 22A, 22B, 22C, 22D are positioned spaced apart from one another in the horizontal direction and offset from one another in pairs in the vertical direction, such that the even-numbered guide rollers 22B, 22D are positioned with a vertical offset (higher) than the odd-numbered guide rollers 22A, 22C. The guide rollers 22A, 22B, 22C, 22D receive the metal composite material laminate 44 with the metal composite material laminate 44 traveling over the first guide roller 22A, under the second guide roller 22B, over the third guide roller 22C, and under the fourth guide roller 22D. In other embodiments not shown in the figures, the guide rollers 22A, 22B, 22C, 22D are positioned spaced apart from one another in the horizontal direction and aligned with one another in the vertical direction. In these embodiments, the guide rollers 22A, 22B, 22C, 22D receive the metal composite material laminate 44 with the metal composite material laminate 44 traveling either over all the guide rollers 22A, 22B, 22C, 22D or under all the guide rollers 22A, 22B, 22C, 22D.

Figure 7:
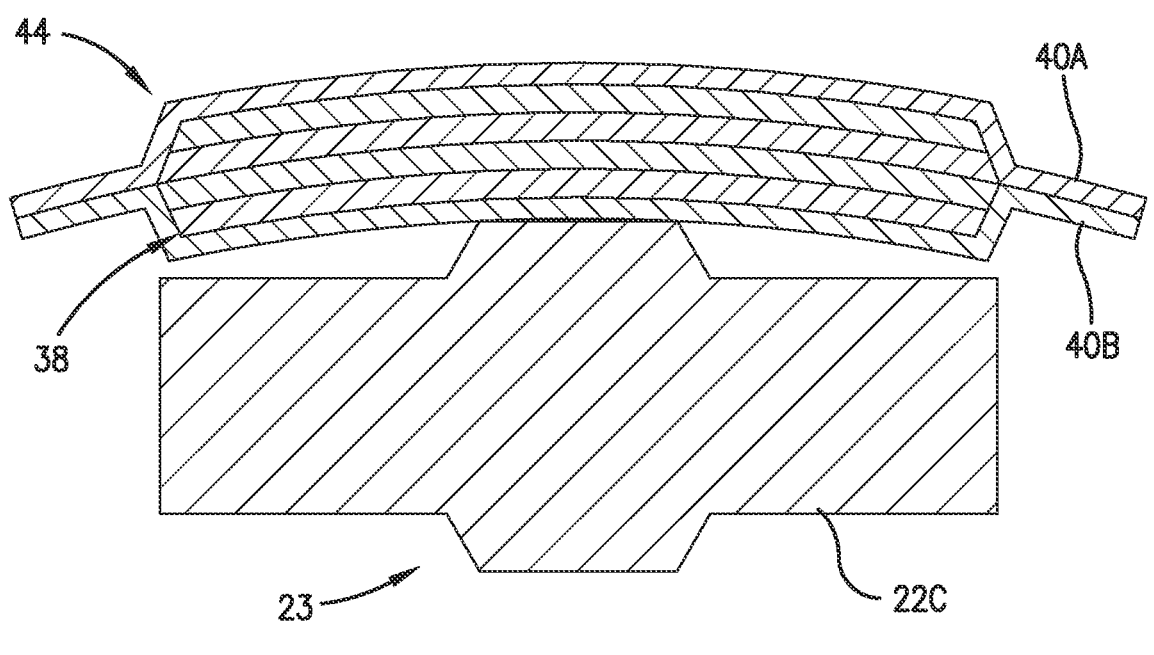
FIG. 7 is a cross-sectional view, cut along line 4-4 of FIG. 1, of a first one of a plurality of guide rollers over which the metal composite material laminate flows, the guide roller having a first profile feature.
Figure 8:
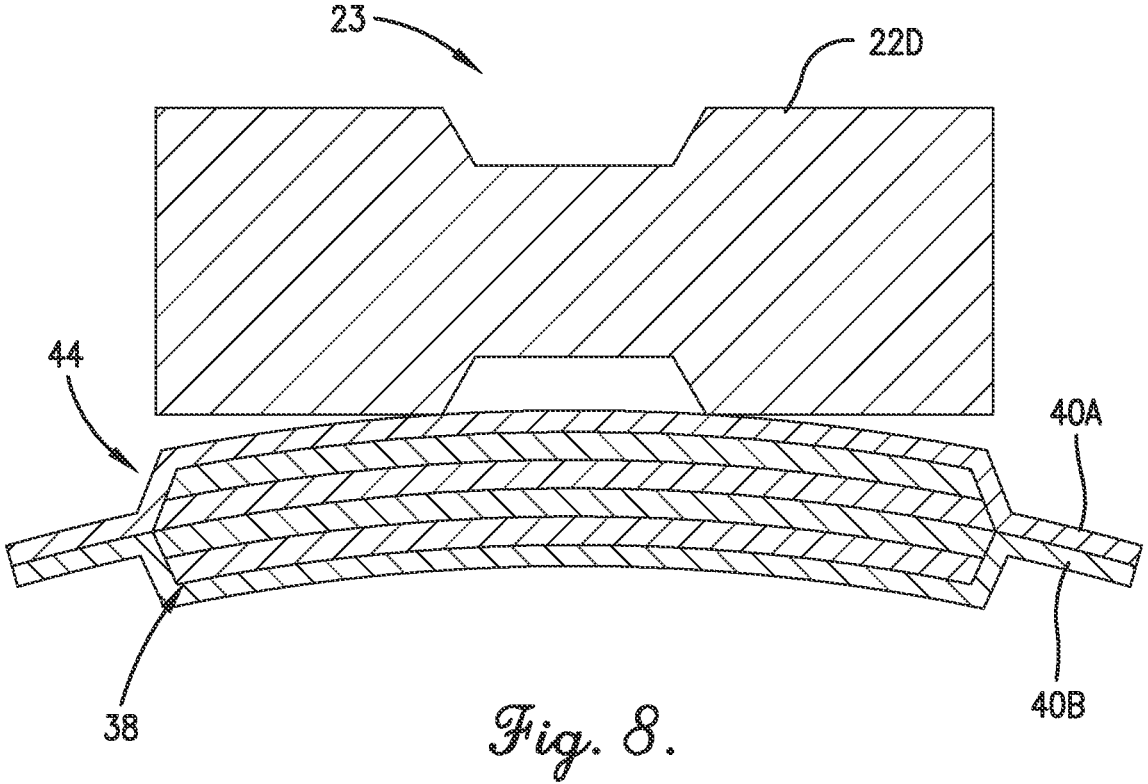
FIG. 8 is a cross-sectional view, cut along line 5-5 of FIG. 1, of a second one of a plurality of guide rollers under which the metal composite material laminate flows, the guide roller having a second profile feature.

The first guide roller 22A and the second guide roller 22B each include a generally cylindrical shaped tube with a circumferential surface configured to rotate about a central longitudinal axis. The third guide roller 22C and the fourth guide roller 22D each also include a generally cylindrical shaped tube with a circumferential surface configured to rotate about a central longitudinal axis, but they further include a central feature 23 that is either concave and extends radially inward or convex and extends radially outward according to their position and the orientation of the part 100 is to be fabricated. The third guide roller 22C has a convex central feature 23, as shown in FIG. 7, given that the third guide roller 22C contacts the bottom of the metal composite material laminate 44 and the part 100 is a hat stringer including a cap that is oriented along the upper surface of the part 100. The fourth guide roller 22D has a concave central feature 23, as shown in FIG. 8, given that the fourth guide roller 22D contacts the top of the metal composite material laminate 44. Furthermore, the cross-sectional shape of the convex and concave central features 23 of the third guide roller 22C and the fourth guide roller 22D corresponds to the cross-sectional shape of the part 100 to be fabricated. For example, the central features 23 may be piecewise linear for a hat type stringer or may be more curved or rounded for a U-stringer.

The oven 24 generally provides thermal energy (heat) to the materials, i.e., the metal composite material laminate, used to fabricate the part 100. The oven 24 includes a chamber defined by a top wall, a bottom wall, two side walls, a front wall and a back wall. The chamber is large enough to accommodate the guide rollers 22A, 22B, 22C, 22D, the forming roller 26, and the pinch rollers 28A, 28B. The front wall includes a first opening through which the metal composite material laminate 44 enters the chamber to encounter the guide rollers 22A, 22B, 22C, 22D. The back wall includes a second opening through which at least a portion of one or both of the pinch rollers 28A, 28B is positioned and through which the heated and formed metal composite material laminate 44 travels before it is cooled and cut to become a part 100.

The forming roller 26 receives the metal composite material laminate 44 and generally applies a curvature to, or forms, the metal composite material laminate 44 as the metal composite material laminate 44 passes through the oven 24 before it is received by the pinch rollers 28A, 28B. The position of the forming roller 26 relative to the pinch rollers 28A, 28B, at least in part, determines a radius of curvature of the metal composite material laminate 44. The forming roller 26 includes a generally cylindrical shaped tube with a circumferential surface configured to rotate about a central longitudinal axis along with either a concave or convex central feature. The concave or convex shape varies according to, or depends on, the orientation of the metal composite material laminate 44 or the part 100 and whether the forming roller 26 is above the metal composite material laminate 44 or below the metal composite material laminate 44. In the example of FIG. 1, since the forming roller 26 is below the metal composite material laminate 44, the forming roller 26 has a convex central feature similar to the third guide roller 22C, as shown in FIG. 7. Furthermore, the cross-sectional shape of the convex and concave central features of the forming roller 26 corresponds to the cross-sectional shape of the part 100 to be fabricated. For example, the central features may be piecewise linear for a hat type stringer or may be more curved or rounded for a U-stringer.

The forming roller 26 is coupled to a positioning device, not shown in the figures, which adjusts a position of the forming roller 26 along a vertical axis (as indicated by the double headed arrow in FIG. 1). In various embodiments, the positioning device may be further configured to adjust a position of the forming roller 26 along a horizontal axis such that the forming roller 26 may be moved in nearly any direction. The positioning device may include a motor which drives an actuator, or other mechanisms, that couple to the forming roller 26 and are configured to extend and retract to provide positioning motion.

Figure 9:
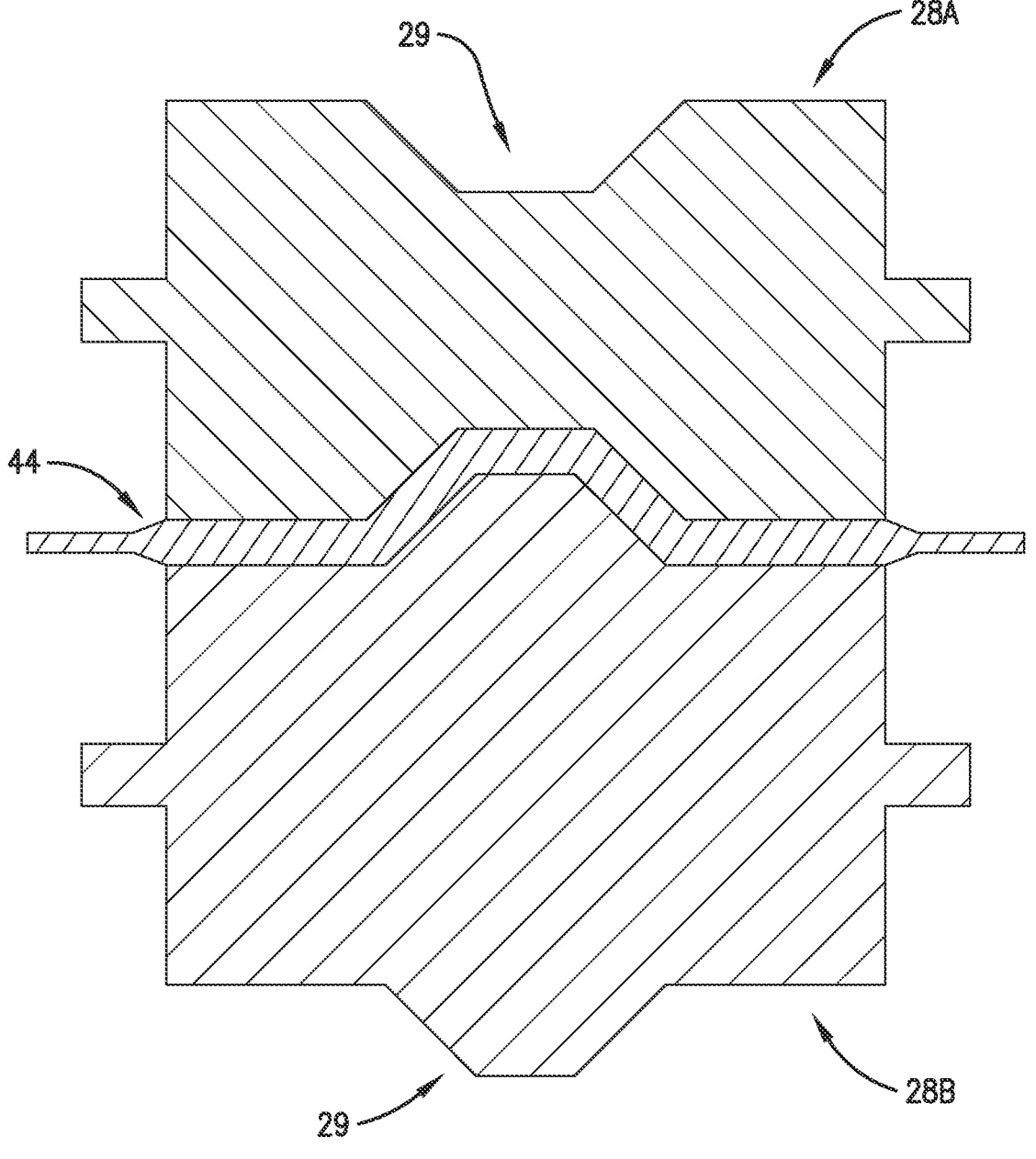
FIG. 9 is a cross-sectional view, cut along line 6-6 of FIG. 1, of a pair of pinch rollers through which the metal composite material laminate is pulled.

The pinch rollers 28A, 28B receive the metal composite material laminate 44 and pull it while applying compression or compaction to give the metal composite material laminate 44 the final shape of the part 100. The pinch rollers 28A, 28B each include a generally cylindrical shaped tube with a circumferential surface configured to rotate about a central longitudinal axis and further include a central feature 29 that is either concave and extends radially inward or convex and extends radially outward. The concave or convex shape varies according to, or depends on, the orientation of the metal composite material laminate 44 or the part 100 and whether the pinch roller 28A, 28B is above the metal composite material laminate 44 or below the metal composite material laminate 44. Referring to FIG. 9, given the orientation as shown, the first pinch roller 28A is positioned above the metal composite material laminate 44 and has a concave central feature 29. The second pinch roller 28B is positioned below the metal composite material laminate 44 and has a convex central feature 29. Furthermore, the cross-sectional shape of the convex and concave central features 29 of the pinch rollers 28A, 28B corresponds to the cross-sectional shape of the part 100 to be fabricated. For example, the central features 29 may be piecewise linear for a hat type stringer or may be more curved or rounded for a U-stringer.

The pinch rollers 28A, 28B are positioned generally parallel to one another so that there is a small gap therebetween. Each pinch roller 28A, 28B is driven, or rotated, by a rotation device, which is not shown in the figures. The rotation device typically includes a motor whose output shaft directly, or indirectly, rotates the pinch roller 28A, 28B.

The pinch rollers 28A, 28B are also positioned along the path of travel for the metal composite material laminate 44 such that at least a portion of one or both of the pinch rollers 28A, 28B are within the chamber of the oven 24. Given this location, the pinch rollers 28A, 28B receive the metal composite material laminate 44 while it is at peak, or near peak, temperature in order to provide the final shape of the part 100.

The vacuum source 30 generally applies a vacuum to the metal composite material laminate 44 and includes a vacuum pump 46 and a vacuum line 48. The vacuum source 30 includes motors and/or other mechanisms configured to create a negative pressure or suction which is available at a port. The vacuum line 48 includes an elongated hose with a first end that is coupled to the port of the vacuum source. A second end of the hose includes a fitting which is connected and sealed to the leading edge of the metal composite material laminate 44. The vacuum source 30 applies a vacuum between the first metal sheet 40A and the second metal sheet 40B in order to provide additional compaction to the metal composite material laminate 44 especially to maintain compaction pressure on the laminate 44 until it is completely solidified due to cooling or cured after sufficient time at temperature.

The cooling system 32 generally cools the metal composite material laminate 44 after it is output from the pinch rollers 28A, 28B and the oven 24. Exemplary embodiments of the cooling system 32 include a plurality of misters, or misting units, that are positioned downstream from the pinch rollers 28A, 28B and spray a misty fluid onto the metal composite material laminate 44. The cooling system 32 may be positioned directly after the pinch rollers 28A, 28B to cause solidification immediately after forming, as would be needed with a thermoplastic composite. Alternatively, the cooling system 32 may be located farther from the pinch rollers 28A, 28B to allow time for a thermosetting resin to cure prior to being cooled.

The cutter 34 cuts the metal composite material laminate 44 in order finalize the part 100. Exemplary embodiments of the cutter 34 include a flying saw that is positioned downstream from the cooling system 32 and configured to be moved along one or more axes. The flying saw includes a blade that cuts the metal composite material laminate 44 after the metal composite material laminate 44 has solidified due to cooling, or after a sufficient time at a temperature for the laminate to cure into a solid.

Before normal operation of the apparatus 10, the apparatus 10 is set up as follows. The thermoplastic composite material plies 36 from each of the thermoplastic composite material spools 12A, 12B, 12C, 12D are fed through the thermoplastic composite material rollers 14A, 14B to form the thermoplastic composite material layup 38. The first metal sheet 40A is placed on the top of the thermoplastic composite material layup 38, and the second metal sheet 40B is placed on the bottom of the thermoplastic composite material layup 38. The metal sheets 40A, 40B and the thermoplastic composite material layup 38 are fed through the welding rollers 20A, 20B to form the metal composite material laminate 44. The electric power supply 42 is activated and welding of the metal sheets 40A, 40B occurs. The metal composite material laminate 44 is fed through the guide rollers 22A, 22B, 22C, 22D and over the forming roller 26. The metal composite material laminate 44 is also fed through the pinch rollers 28A, 28B. The vacuum line 48 of the vacuum source 30 is attached to the leading edge of the metal composite material laminate 44. The rotation devices which rotate the pinch rollers 28A, 28B are activated so that the metal composite material laminate 44 is pulled, thereby creating the flow of the thermoplastic composite material plies 36 and the metal sheets 40A, 40B through the apparatus 10.

The apparatus 10 generally operates as follows with reference to FIG. 1. The thermoplastic composite material plies 36 from each of the thermoplastic composite material spools 12A, 12B, 12C, 12D flow through the thermoplastic composite material rollers 14A, 14B forming the thermoplastic composite material layup 38. The thermoplastic composite material layup 38 and the metal sheets 40A, 40B flow through the welding rollers 20A, 20B to form the metal composite material laminate 44, as shown in FIG. 6. The brake 18 may be utilized to impede the rotation of the first sheet metal spool 16 to create, or increase, the tension on the first metal sheet 40A. A large amount of electric current passes through the flanges of the welding rollers 20A, 20B and through the overhang of the metal sheets 40A, 40B, which welds the two metal sheets 40A, 40B together along the side edges of the metal composite material laminate 44. The metal composite material laminate 44 flows through the guide rollers 22A, 22B, 22C, 22D within the oven 24, which raises the temperature of the metal composite material laminate 44 to a plastic state. The cross-sectional shape of the metal composite material laminate 44 starts to form, as shown in FIGS. 7 and 8. The metal composite material laminate 44 flows over the forming roller 26, which is raised or lowered, or moved in another direction, relative to the pinch rollers 28A, 28B selectively to control, at least in part, the radius of curvature of the metal composite material laminate 44. The metal composite material laminate 44 is pulled through the pinch rollers 28A, 28B, while at the same time is compressed or compacted. The metal composite material laminate 44 flows through the cooling system 32 wherein a cooling mist is applied to the surfaces of the metal composite material laminate 44, reducing its temperature. As the metal composite material laminate 44 is further expelled from the pinch rollers 28A, 28B, the vacuum line 48 moves with the leading edge of the metal composite material laminate 44 and continues to provide suction between the first metal sheet 40A and the second metal sheet 40B of the metal composite material laminate 44. When the metal composite material laminate 44 reaches an appropriate length, the cutter 34 cuts the metal composite material laminate 44 and the part 100 is complete.

Figure 10:
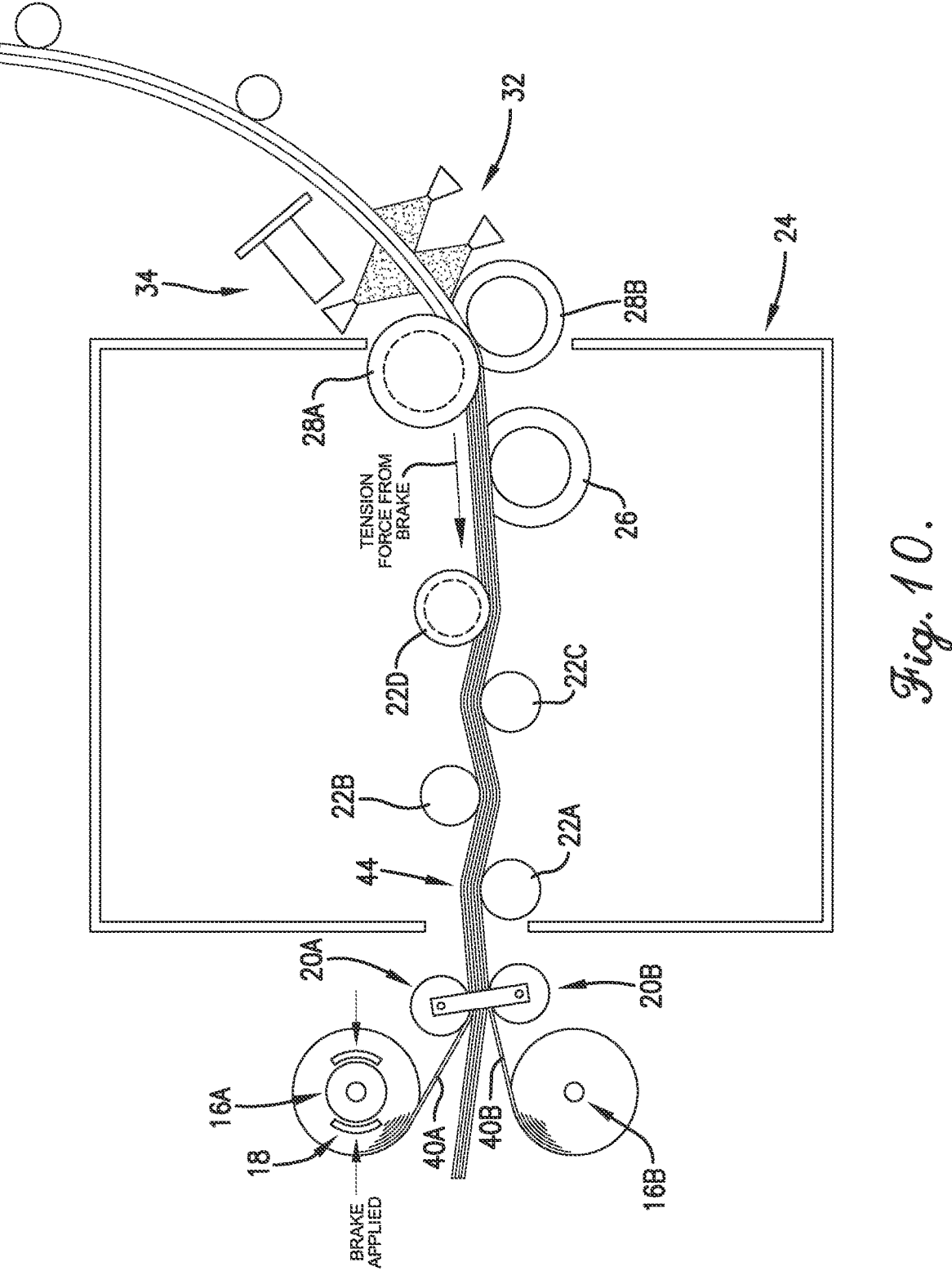
FIG. 10 is a side schematic view of a portion of the apparatus of FIG. 1, illustrating application of a brake when curvature of the part occurs in a first direction.
Figure 11:
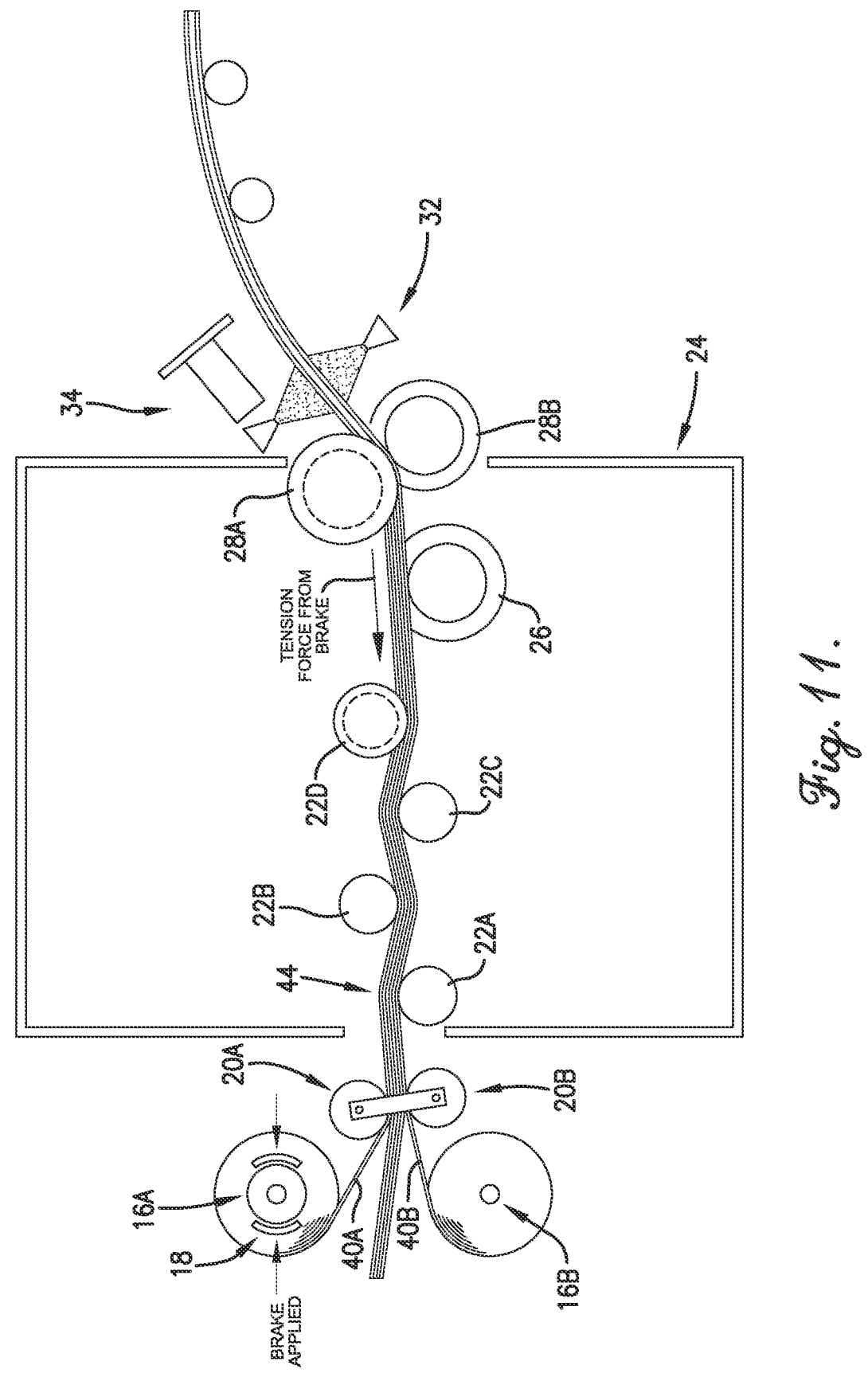
FIG. 11 is a side schematic view of the portion of the apparatus, illustrating application of the brake when curvature of the part occurs in a second direction—opposite to the first direction.

The apparatus 10 provides adjustment or control of the amount of curvature, such as increasing or decreasing the radius of curvature, of the composite material part 100 in addition to the curvature set by the forming roller 26 and the pinch rollers 28A, 28B. One way to additionally control the curvature of the part 100 is to apply the brake 18 on the first metal sheet 40A to create a differential tension or strain in the longitudinal direction between the first metal sheet 40A and the second metal sheet 40B. The brake 18 may be applied with a variable amount of braking and a variable duration of braking. The differential tension is used in combination with the actions of the forming roller 26 and the pinch rollers 28A, 28B, in summation or subtraction, to control the radius of curvature of the metal composite material laminate 44. For example as shown in FIG. 10, the brake 18 may be applied when the forming roller 26 and the pinch rollers 28A, 28B are operating to apply a curvature in a first direction to increase the amount of curvature. Or as shown in FIG. 11, the brake 18 may be applied when the forming roller 26 and the pinch rollers 28A, 28B are operating to apply a curvature in a second, opposite direction to decrease the amount of curvature.

Another way to additionally control the curvature and aspects of the profile of the composite material part 100 is to use a metal and/or metal alloy for the first metal sheet 40A that is different from the metal and/or metal alloy that is used for the second metal sheet 40B. In particular, the metals and/or metal alloys should have different thermal properties, in particular, coefficients of thermal expansion and contraction. The different thermal properties may result in different rates of contraction which create different stresses between the sheets 40A, 40B during the cooling process, such that the first metal sheet 40A contracts more quickly than the second metal sheet 40B, or vice versa. The result of the differential contraction is that one surface of the composite material part 100, i.e., the first metal sheet 40A or the second metal sheet 40B, pulls on the thermoplastic composite material layup 38 and the other surface to change the cross-sectional shape of the composite material part 100 such that a curvature or curling results. As the composite material cools, the change in cross-sectional shape becomes permanent. The amount of curvature or curling due to material properties between the first metal sheet 40A and the second metal sheet 40B may also vary inversely according to a thickness of the metal composite material laminate 44. For example, the amount of curvature is generally greater for a relatively thinner metal composite material laminate 44 compared to a relatively thicker metal composite material laminate 44.

Figure 12:
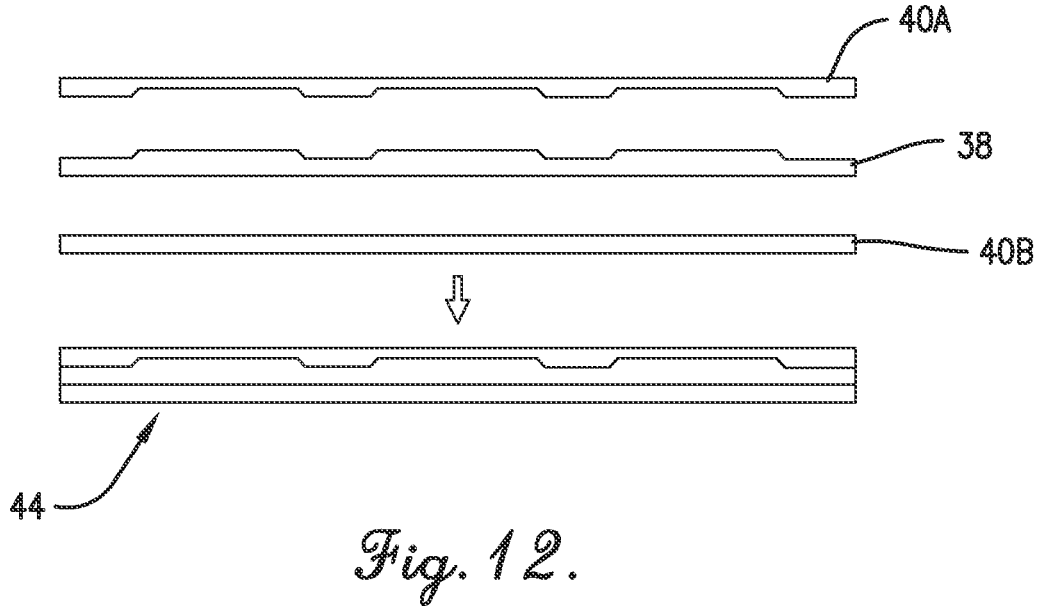
FIG. 12 is a side view of a metal composite material laminate including layers of a first metal sheet, a composite material layup, and a second metal sheet wherein at least some of the layers have a non-uniform thickness and in an upper image, the layers are separated, and in a lower image, the layers are assembled to form the laminate.

The apparatus 10 is also operable to form metal composite material laminates 44 when the thermoplastic composite material layup 38 has a non-uniform thickness. Referring to FIG. 12, the thermoplastic composite material layup 38 may have periodic or irregular changes in thickness. At least one or both of the metal sheets 40A, 40B may be processed to include periodic or irregular changes in thickness that match, or are complementary to, the thickness patterns in the thermoplastic composite material layup 38. The metal sheets 40A, 40B may have subtractive manufacturing techniques, such as machining or etching, applied to them to form the appropriate thicknesses. Alternatively, the metal sheets 40A, 40B may have additive manufacturing techniques, such as lamination or 3-D printing, applied to them to form the appropriate thicknesses.

At least a portion of the steps of a method 200 for roll forming thermoplastic composites is shown in FIG. 13. The steps are performed by various components of the apparatus 10 as described below.

Referring to step 201, a thermoplastic composite material layup 38 is formed. The thermoplastic composite material layup 38 comprises a plurality of thermoplastic composite material plies 36 positioned one on another to create a stack, wherein each thermoplastic composite material ply 36 is a layer of fibers or fabric extending in one or more directions or having one or more orientations that are coordinated to the load path or loading characteristics of the structure. Each thermoplastic composite material ply 36 is retained on one of a plurality of thermoplastic composite material spools 12A, 12B, 12C, 12D. The thermoplastic composite material plies 36 are unspooled and flow through a pair of thermoplastic composite material rollers 14A, 14B to form the thermoplastic composite material layup 38.

Common fiber orientation angles for thermoplastic composite material plies 36 are shown in the figures. Referring to FIG. 3A, a zero-degree fiber orientation is shown. Referring to FIG. 3B, a 90-degree fiber orientation is shown. Referring to FIG. 3C, a 45-degree fiber orientation is shown. Referring to FIG. 3D, a negative 45-degree fiber orientation is shown.

The fibers of the thermoplastic composite material plies 36, at least in the axial direction, are considered to be continuous. To achieve a higher radius of curvature and/or a larger cross-sectional profile of some of the composite material parts 100 which may be fabricated using the various embodiments of the current invention, the length of the fibers of the thermoplastic composite material plies 36 from one thermoplastic composite material ply 36 to another thermoplastic composite material ply 36 along the axial orientation varies during and after the curvature forming process. Generally, the length of the curve along the outer circumference is greater than the length of the curve along the inner circumference. Thus, the length of the axial oriented fibers of the thermoplastic composite material ply 36 on the outer circumference will need to be longer than the axial oriented fibers of the thermoplastic composite material ply 36 on the inner circumference. However, typically, continuous fibers are not extensible and do not yield enough in the axial direction to provide the amount of curvature that the composite material part 100 requires. As a result, in some embodiments, the fibers of the thermoplastic composite material plies 36, at least those oriented in the axial direction, are discontinuous, including stretch-broken fiber or aligned short fiber reinforcements. Other discontinuous fiber options include tailored universal feed stock for forming (TuFF) described in U.S. Pat. No. 10,669,659.

If only continuous fibers are used in the thermoplastic composite material plies 36, then zero-degree fibers are utilized only in the cap or apex of the final part 100 and only adjacent to the surface which has the smaller radius of curvature or forms the inner circumference of the curvature. For example, referring to FIG. 4A, a side view of a hat stringer final part 100 is shown, wherein the lower surface has the smaller radius of curvature and forms the inner circumference of the curvature. Therefore, as shown in the cross-sectional view of FIG. 4B, the zero-degree fibers are positioned adjacent to the lower surface in the cap, just above a layer of metal, described in more detail below. In the embodiment of FIG. 4B, the thermoplastic composite material spool 12D holds the zero-degree fiber thermoplastic composite material ply 36. Other orientations of the fibers form the remainder of the layers of the stack of thermoplastic composite material plies 36. Another example is shown in the side view of the hat stringer final part 100 of FIG. 5A, wherein the upper surface has the smaller radius of curvature and forms the inner circumference of the curvature. Therefore, as shown in the cross-sectional view of FIG. 5B, the zero-degree fibers are positioned adjacent to the upper surface, just below a layer of metal. In the embodiment of FIG. 5B, the thermoplastic composite material spool 12B holds the zero-degree fiber thermoplastic composite material ply 36. In addition, the zero-degree fiber thermoplastic composite material ply 36 has a width roughly equal to a width of the top or bottom, as appropriate, of the cap of the final part 100.

Referring to step 202, a metal composite material laminate 44 is formed. The metal composite material laminate 44 comprises a first metal sheet 40A, the thermoplastic composite material layup 38, and a second metal sheet 40B, stacked in that order from top to bottom. Each metal sheet 40A, 40B is retained on one of a plurality of sheet metal spools 16A, 16B. The metal sheets 40A, 40B are unspooled and flow, along with the thermoplastic composite material layup 38, through a pair of welding rollers 20A, 20B to form the metal composite material laminate 44, as shown in FIG. 6.

The brake 18 may be applied to provide resistance to the rotation of one of the sheet metal spools, which, in exemplary embodiments, is the first sheet metal spool 16A. The braking creates a tensile strain on the first metal sheet 40A, but not on the second metal sheet 40B—which in turn, forms a differential tension or strain in the longitudinal direction between the two metal sheets 40A, 40B. The brake 18 may be applied with a variable amount of braking and a variable duration of braking. The differential tension is used in combination with the actions of the forming roller 26 and the pinch rollers 28A, 28B, in summation or subtraction, to control the radius of curvature of the metal composite material laminate 44. For example as shown in FIG. 10, the brake 18 may be applied when the forming roller 26 and the pinch rollers 28A, 28B are operating to apply a curvature in a first direction to increase the amount of curvature. Or as shown in FIG. 11, the brake 18 may be applied when the forming roller 26 and the pinch rollers 28A, 28B are operating to apply a curvature in a second, opposite direction to decrease the amount of curvature.

In order to additionally control the curvature and aspects of the profile of the composite material part 100, a metal and/or metal alloy for the first metal sheet 40A is used that is different from the metal and/or metal alloy that is used for the second metal sheet 40B. In particular, the metals and/or metal alloys should have different thermal properties, in particular, coefficients of thermal expansion and contraction. The different thermal properties may result in different rates of contraction which create different stresses between the sheets 40A, 40B during the cooling process, such that the first metal sheet 40A contracts more quickly than the second metal sheet 40B, or vice versa. The result of the differential contraction is that one surface of the composite material part 100, i.e., the first metal sheet 40A or the second metal sheet 40B, pulls on the thermoplastic composite material layup 38 and the other surface to change the cross-sectional shape of the composite material part 100 such that a curvature or curling results. As the composite material cools, the change in cross-sectional shape becomes permanent. The amount of curvature or curling due to material properties between the first metal sheet 40A and the second metal sheet 40B may also vary inversely according to a thickness of the metal composite material laminate 44. For example, the amount of curvature is generally greater for a relatively thinner metal composite material laminate 44 compared to a relatively thicker metal composite material laminate 44.

Referring to step 203, the first metal sheet 40A is welded to the second metal sheet 40B. The metal sheets 40A, 40B each have a width that is greater than a width of the thermoplastic composite material layup 38 so that, in the stack, the metal sheets 40A, 40B overhang the thermoplastic composite material layup 38 along the sides of the metal composite material laminate 44. Referring to FIG. 6, the metal composite material laminate 44 travels between the welding rollers 20A, 20B such that the thermoplastic composite material layup 38 is positioned between the flanges of the welding rollers 20A, 20B. The overhang of the metal sheets 40A, 40B along one side of the metal composite material laminate 44 contacts the flanges of one end of each welding roller 20A, 20B, and the overhang of the metal sheets 40A, 40B along the other side of the metal composite material laminate 44 contacts the flanges of the other end of each welding roller 20A, 20B.

The welding rollers 20A, 20B may utilize one of many techniques of welding widely known in the art for welding thin foil sheets such as resistance, ultrasonic, laser or other methods of welding, each being more applicable for particular foil metals. Although many methods of welding foil can be used, the example of resistance welding will be described herein but other methods can be used without departing from the scope of the technology as recited in the claims.

The central rod of each welding roller 20A, 20B is electrically connected to the electric power supply 42. In general, the welding rollers 20A, 20B are electrically connected to the electric power supply 42 so that there is an electric voltage between the two welding rollers 20A, 20B and electric current flows through the flanges of the first welding roller 20A, the overhang of the metal sheets 40A, 40B on each side of the metal composite material laminate 44, and the flanges of the second welding roller 20B. As the electric current flows through the overhang of the metal sheets 40A, 40B on each side of the metal composite material laminate 44, the first metal sheet 40A is welded to the second metal sheet 40B along the overhang strips.

Referring to step 204, the metal composite material laminate 44 is heated to create a heated metal composite material laminate 44. The metal composite material laminate 44 flows or travels through a chamber of an oven 24. Also present in the chamber of the oven 24 is a plurality of guide rollers 22A, 22B, 22C, 22D through which the metal composite material laminate 44 flows or travels as it is being heated. At least some of the guide rollers 22A, 22B, 22C, 22D include features that start to form or shape the metal composite material laminate 44 as it is heated. For example, the third guide roller 22C and the fourth guide roller 22D each also include a generally cylindrical shaped tube with a circumferential surface configured to rotate about a central longitudinal axis, but they further include either a concave or convex central feature according to their position and the orientation of the part 100 is to be fabricated. The third guide roller 22C has a convex central feature, as shown in FIG. 7, given that the third guide roller 22C contacts the bottom of the metal composite material laminate 44 and the part 100 is a hat stringer including a cap that is oriented along the upper surface of the part 100. The fourth guide roller 22D has a concave central feature, as shown in FIG. 8, given that the fourth guide roller 22D contacts the top of the metal composite material laminate 44. Furthermore, the cross-sectional shape of the convex and concave central features of the third guide roller 22C and the fourth guide roller 22D corresponds to the cross-sectional shape of the part 100 to be fabricated. For example, the central features may be piecewise linear for a hat type stringer or may be more curved or rounded for a U-stringer.

Referring to step 205, a force is applied to a portion of the heated metal composite material laminate 44 to impart a curvature to the metal composite material laminate 44. The force is applied by a forming roller 26 which includes a generally cylindrical shaped tube with a circumferential surface configured to rotate about a central longitudinal axis along with either a concave or convex central feature. The concave or convex shape varies according to, or depends on, the orientation of the metal composite material laminate 44 or the part 100 and whether the forming roller 26 is above the metal composite material laminate 44 or below the metal composite material laminate 44. In the example of FIG. 1, since the forming roller 26 is below the metal composite material laminate 44, the forming roller 26 has a convex central feature similar to the third guide roller 22C, as shown in FIG. 7. Furthermore, the cross-sectional shape of the convex and concave central features of the forming roller 26 corresponds to the cross-sectional shape of the part 100 to be fabricated. For example, the central features may be piecewise linear for a hat type stringer or may be more curved or rounded for a U-stringer.

The forming roller 26 is coupled to a positioning device, not shown in the figures, which adjusts a position of the forming roller 26 along a vertical axis (as indicated by the double headed arrow in FIG. 1). In various embodiments, the positioning device may be further configured to adjust a position of the forming roller 26 along a horizontal axis such that the forming roller 26 may be moved in nearly any direction. The positioning device may include a motor which drives an actuator, or other mechanisms, that couple to the forming roller 26 and are configured to extend and retract to provide positioning motion.

Referring to step 206, a compaction is applied to a portion of the heated metal composite material laminate 44. The compaction is applied by a pair of pinch rollers 28A, 28B which receive the metal composite material laminate 44 and pull it while applying compression or compaction to give the metal composite material laminate 44 the final shape of the part 100. The pinch rollers 28A, 28B each include a generally cylindrical shaped tube with a circumferential surface configured to rotate about a central longitudinal axis along with either a concave or convex central feature. The concave or convex shape varies according to, or depends on, the orientation of the metal composite material laminate 44 or the part 100 and whether the pinch roller 28A, 28B is above the metal composite material laminate 44 or below the metal composite material laminate 44. Referring to FIG. 9, given the orientation as shown, the first pinch roller 28A is positioned above the metal composite material laminate 44 and has a concave central feature. The second pinch roller 28B is positioned below the metal composite material laminate 44 and has a convex central feature. Furthermore, the cross-sectional shape of the convex and concave central features of the pinch rollers 28A, 28B corresponds to the cross-sectional shape of the part 100 to be fabricated. For example, the central features may be piecewise linear for a hat type stringer or may be more curved or rounded for a U-stringer.

The pinch rollers 28A, 28B are positioned generally parallel to one another so that there is a small gap therebetween. Each pinch roller 28A, 28B is driven, or rotated, by a rotation device, which is not shown in the figures. The rotation device typically includes a motor whose output shaft directly, or indirectly, rotates the pinch roller 28A, 28B.

The pinch rollers 28A, 28B are also positioned along the path of travel for the metal composite material laminate 44 such that at least a portion of one or both of the pinch rollers 28A, 28B are within the chamber of the oven 24. Given this location, the pinch rollers 28A, 28B receive the metal composite material laminate 44 while it is at peak, or near peak, temperature in order to provide the final shape of the part 100.

Referring to step 207, a vacuum is applied between the first metal sheet 40A and the second metal sheet 40B of the metal composite material laminate 44. The vacuum is applied by a vacuum source 30 comprising a vacuum pump 46 and a vacuum line 48. The vacuum source 30 includes motors and/or other mechanisms configured to create a negative pressure or suction which is available at a port. The vacuum line 48 includes an elongated hose with a first end that is coupled to the port of the vacuum source. A second end of the hose includes a fitting which is connected and sealed to the leading edge of the metal composite material laminate 44. The vacuum source 30 applies a vacuum between the first metal sheet 40A and the second metal sheet 40B in order to provide additional compaction to the metal composite material laminate 44 especially to maintain compaction pressure on the laminate 44 until it is completely solidified due to cooling or cured after sufficient time at temperature.

Referring to step 208, the metal composite material laminate 44 is cooled after the heated metal composite material laminate 44 is compacted. The metal composite material laminate 44 is cooled by a cooling system 32 comprising a plurality of misters, or misting units, that are positioned downstream from the pinch rollers 28A, 28B and spray a misty fluid onto the metal composite material laminate 44.

Referring to step 209, the metal composite material laminate 44 is cut to form a part 100. The metal composite material laminate 44 is cut by a cutter 34 comprising a flying saw that is positioned downstream from the cooling system 32 and configured to be moved along one or more axes. The flying saw includes a blade that cuts the metal composite material laminate 44 after the metal composite material laminate 44 has solidified due to cooling, or after a sufficient time at a temperature for the laminate to cure into a solid.

The method 200 is also utilized to provide adjustment or control of the amount of curvature, such as increasing or decreasing the radius of curvature, of the composite material part 100 in addition to the curvature set by the forming roller 26 and the pinch rollers 28A, 28B in the same manner, and with the same result, as the apparatus 10 described above.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for roll forming thermoplastic composite parts, the method comprising:

forming a composite material layup including a plurality of thermoplastic composite material plies positioned one on another to create a stack:

forming a metal composite material laminate including a first metal sheet positioned in contact with an upper surface of the composite material layup and a second metal sheet positioned in contact with a lower surface of the composite material layup;

heating the metal composite material laminate to create a heated metal composite material laminate;

applying a force to a portion of the heated metal composite material laminate to impart a curvature to the metal composite material laminate; and applying a compaction to the heated metal composite material laminate after the force is applied; and placing a zero-degree thermoplastic composite material ply on a top of the thermoplastic composite material layup or a bottom of the thermoplastic composite material layup according to a direction of longitudinal curvature of the thermoplastic composite part.

2. The method of claim 1, further comprising welding the first metal sheet to the second metal sheet along side edges of the thermoplastic composite material layup.

3. The method of claim 1, further comprising applying a vacuum between the first metal sheet and the second metal sheet of the metal composite material laminate.

4. The method of claim 1, further comprising applying a tension to one of the first metal sheet or the second metal sheet in order to control an amount of curvature of the metal composite material laminate.

5. The method of claim 1, further comprising cooling the metal composite material laminate after the heated metal composite material laminate is compacted.

6. The method of claim 1, further comprising controlling at least one of a level of the force and a direction of the force applied to the portion of the heated metal composite material laminate to control a radius of the curvature of the heated metal composite material laminate.

7. The method of claim 1, further comprising pulling the heated metal composite material laminate across a pair of pinch rollers including a longitudinal axis that is non linear so as to apply a non linear shape in a plurality of directions to the heated metal composite material laminate.

8. A method for roll forming thermoplastic composite parts, the method comprising:

forming a composite material layup including a plurality of thermoplastic composite material plies positioned one on another to create a stack:

forming a metal composite material laminate including a first metal sheet positioned in contact with an upper surface of the composite material layup and a second metal sheet positioned in contact with a lower surface of the composite material layup;

heating the metal composite material laminate to create a heated metal composite material laminate;

applying a force to a portion of the heated metal composite material laminate to impart a curvature to the metal composite material laminate; and applying a compaction to the heated metal composite material laminate after the force is applied, wherein the first metal sheet has a coefficient of thermal expansion that is different from a coefficient of thermal expansion for the second metal sheet.

9. The method of claim 8, further comprising welding the first metal sheet to the second metal sheet along side edges of the thermoplastic composite material layup.

10. The method of claim 8, further comprising applying a vacuum between the first metal sheet and the second metal sheet of the metal composite material laminate.

11. The method of claim 8, further comprising applying a tension to one of the first metal sheet or the second metal sheet in order to control an amount of curvature of the metal composite material laminate.

12. The method of claim 8, further comprising cooling the metal composite material laminate after the heated metal composite material laminate is compacted.

13. The method of claim 8, further comprising controlling at least one of a level of the force and a direction of the force applied to the portion of the heated metal composite material laminate to control a radius of the curvature of the heated metal composite material laminate.

14. The method of claim 8, further comprising pulling the heated metal composite material laminate across a pair of pinch rollers including a longitudinal axis that is non linear so as to apply a non linear shape in a plurality of directions to the heated metal composite material laminate.

15. The method of claim 8, further comprising placing a zero-degree thermoplastic composite material ply on a top of the thermoplastic composite material layup or a bottom of the thermoplastic composite material layup according to a direction of longitudinal curvature of the thermoplastic composite part.

16. The method of claim 8, wherein the first metal sheet has a coefficient of thermal expansion that is different from a coefficient of thermal expansion for the second metal sheet.

* * * * *